US012546843B2

(12) United States Patent
Nishida

(10) Patent No.: US 12,546,843 B2
(45) Date of Patent: Feb. 10, 2026

(54) ELECTRONIC DEVICE, PROCESSING METHOD, AND NON-TRANSITORY COMPUTER-READABLE STORAGE MEDIUM STORING PROGRAM

(71) Applicant: SEIKO EPSON CORPORATION, Tokyo (JP)

(72) Inventor: Kota Nishida, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 280 days.

(21) Appl. No.: 18/158,855

(22) Filed: Jan. 24, 2023

(65) Prior Publication Data

US 2023/0236277 A1 Jul. 27, 2023

(30) Foreign Application Priority Data

Jan. 26, 2022 (JP) .................................. 2022-010071

(51) Int. Cl.
*G01S 1/04* (2006.01)
*G06F 1/3206* (2019.01)
*H04W 4/80* (2018.01)

(52) U.S. Cl.
CPC ............ *G01S 1/042* (2013.01); *G06F 1/3206* (2013.01); *H04W 4/80* (2018.02)

(58) Field of Classification Search
CPC ......... G01S 1/042; H04W 4/80; G06F 1/3206
See application file for complete search history.

(56) References Cited

U.S. PATENT DOCUMENTS

| 2013/0194394 | A1* | 8/2013 | Shintani ............... H04N 13/373 348/51 |
| 2016/0124496 | A1 | 5/2016 | Horishita |
| 2019/0182415 | A1* | 6/2019 | Sivan ....................... G06F 3/013 |
| 2019/0246232 | A1* | 8/2019 | Singh ....................... H04S 7/303 |
| 2021/0037149 | A1 | 2/2021 | Nagahara |
| 2021/0092250 | A1* | 3/2021 | Iritani ................. H04N 1/00896 |
| 2022/0035510 | A1* | 2/2022 | Behzadi ................... H04W 4/80 |

FOREIGN PATENT DOCUMENTS

| JP | 2016087921 | 5/2016 |
| JP | 2020197419 | 12/2020 |
| JP | 2021024120 | 2/2021 |
| WO | 2019/163627 A | 8/2019 |

* cited by examiner

*Primary Examiner* — David Bilodeau
(74) *Attorney, Agent, or Firm* — WORKMAN NYDEGGER

(57) ABSTRACT

An electronic device wirelessly communicates with an information processing device via a wireless communication unit and can operate at least in a first mode and in a second mode that is a state where power consumption is higher than in the first mode. The electronic device includes a direction information acquisition unit and a processor. The direction information acquisition unit acquires direction information about a direction of the information processing device in relation to a reference location of the electronic device by the wireless communication with the information processing device via the wireless communication unit. The processor performs at least one of a transition from the first mode to the second mode and a transition from the second mode to the first mode, based on the direction information.

14 Claims, 13 Drawing Sheets the wireless communication with the information processing device via the wireless communication unit; and a processing unit performing at least one of a transition from the first mode to the second mode and a transition from the second mode to the first mode, based on the direction information acquired by the direction information acquisition unit.

ELECTRONIC DEVICE, PROCESSING METHOD, AND NON-TRANSITORY COMPUTER-READABLE STORAGE MEDIUM STORING PROGRAM

The present application is based on, and claims priority from JP Application Serial Number 2022-010071, filed Jan. 26, 2022, the disclosure of which is hereby incorporated by reference herein in its entirety.

BACKGROUND

1. Technical Field

The present disclosure relates to an electronic device, a processing method, and a non-transitory computer-readable storage medium storing a program, or the like.

2. Related Art

According to the related art, an electronic device having a normal mode and a power-saving mode is known. WO2019/163627A discloses a technique of making transitions between the normal mode and the power-saving mode, using a sensor or the like.

However, WO2019/163627A does not disclose a technique of controlling the mode of the electronic device at a proper timing, using direction information.

SUMMARY

An aspect of the present disclosure relates to an electronic device that wirelessly communicates with an information processing device via a wireless communication unit and that can operate at least in a first mode and in a second mode that is a state where power consumption is higher than in the first mode. The electronic device includes: a direction information acquisition unit acquiring direction information about a direction of the information processing device in relation to a reference location of the electronic device by the wireless communication with the information processing device via the wireless communication unit; and a processing unit performing at least one of a transition from the first mode to the second mode and a transition from the second mode to the first mode, based on the direction information.

Another aspect of the present disclosure relates to a processing method including: processing of wirelessly communicating with an information processing device; processing of causing an electronic device to operate at least in a first mode and in a second mode that is a state where power consumption is higher than in the first mode; processing of acquiring direction information about a direction of the information processing device in relation to a reference location of the electronic device by the wireless communication with the information processing device; and at least one of processing of performing a transition from the first mode to the second mode and processing of performing a transition from the second mode to the first mode, based on the direction information.

Still another aspect of the present disclosure relates to a non-transitory computer-readable storage medium storing a program. The program is used for an electronic device that wirelessly communicates with an information processing device via a wireless communication unit and that can operate at least in a first mode and in a second mode that is a state where power consumption is higher than in the first mode. The program causes a computer to function as: a direction information acquisition unit acquiring direction information about a direction of the information processing device in relation to a reference location of the electronic device by the wireless communication with the information processing device via the wireless communication unit; and a processing unit performing at least one of a transition from the first mode to the second mode and a transition from the second mode to the first mode, based on the direction information acquired by the direction information acquisition unit.

BRIEF DESCRIPTION OF THE DRAWINGS

FIG. 1 explains an example of the configuration of an electronic device or the like.

DESCRIPTION OF EXEMPLARY EMBODIMENTS

An embodiment will now be described. However, the embodiment described below should not unduly limit the contents of the present disclosure described in the claims. Not all the components described in the embodiment are necessarily essential components of the present disclosure.

Figure 1:
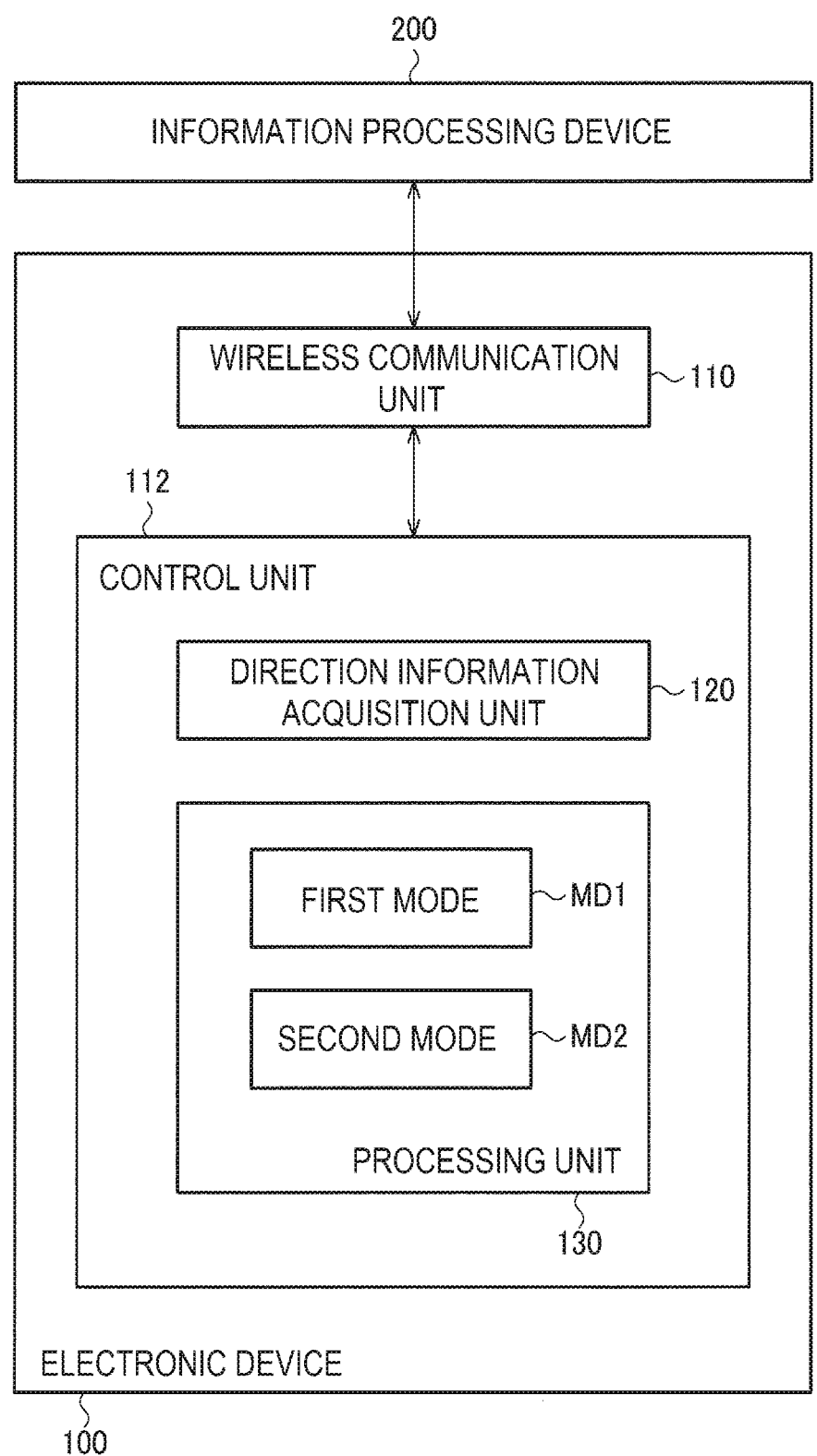

FIG. 1 is a block diagram explaining an example of the configuration of a system including an electronic device 100 and an information processing device 200 according to this embodiment. The electronic device 100 includes a wireless communication unit 110 and a control unit 112. The electronic device 100 wirelessly communicates with the information processing device 200 via the wireless communication unit 110. However, the electronic device 100 in this embodiment is not limited to the configuration shown in FIG. 1 and can be implemented with various modifications such as omitting a part of the components thereof or adding another component. The another component is, for example, a display unit, a memory or the like. Although not illustrated in FIG. 1, the electronic device 100 may also include an operation unit 140. The operation unit 140 may be a piece of hardware integrated with the display unit, not illustrated, for example, using a touch panel.

The electronic device 100 in this embodiment is, for example, a printer but may be a scanner, a personal computer, a wearable device, a biological information measuring device, a robot, a video device, or a physical quantity measuring device or the like. The wearable device refers to a smartwatch or an activity tracker or the like. The biological information measuring device refers to a pulsimeter or a pedometer or the like. The video device refers to a camera or a projector or the like. The physical quantity measuring device refers to a thermometer or a weight scale or the like. The printer in this example includes a multifunction peripheral. The multifunction peripheral refers to a printer including other functions than a printer function. The other functions than the printer function include a copy function, a facsimile function, or a scanner function or the like, and may also be other functions. The information processing device 200 is, for example, a portable information terminal such as a smartphone but may be a personal computer or the like as described above. The configuration of the system including the electronic device 100 and the information processing device 200 according to the embodiment is not limited to the example shown in FIG. 1. For example, the electronic device 100 may wirelessly communicate with a plurality of information processing devices 200, and the information processing device 200 may wirelessly communicate with a plurality of electronic devices 100.

The electronic device 100 in this embodiment can operate in a plurality of modes. A mode can also be referred to as a state. For example, the electronic device 100 in this embodiment can operate at least in a first mode MD1 and in a second mode MD2. The power consumption of the electronic device 100 in this embodiment may differ between the modes. For example, the power consumption in the second mode MD2 may be higher than in the first mode MD1. That is, the electronic device 100 in this embodiment can operate at least in the first mode MD1 and in the second mode MD2, which is a state where the power consumption is higher than in the first mode MD1. For example, based on the control of the on- or off-state of a first flag, not illustrated, by a processing unit 130, described later, whether the electronic device 100 is in the first mode MD1 or in the second mode MD2 can be determined. In the description below, it is assumed that the second mode MD2 is a state where the power consumption is higher than in the first mode MD1.

Specifically, the second mode MD2 can be, for example, a mode to which the electronic device 100 shifts as a boot program of the electronic device 100 starts in response to a user selecting a power switch, not illustrated, of the electronic device 100 in a circumstance where the electronic device 100 is supplied with power. In other words, the second mode MD2 is a mode where the supply of power to each function forming the electronic device 100 is not limited and where all the components of the electronic device 100 can be driven. Meanwhile, the first mode MD1 can be a state where the supply of power or the like to a part of the components of the electronic device 100 is limited, thus reducing the power consumption of the electronic device 100. The first mode MD1 can be referred to as an electricity-saving state or a power-saving state. Limiting the supply of power or the like means, for example, stopping the supply of power to a predetermined component or causing the predetermined component to operate based on a clock with a lower operating frequency than a clock operating in normal times. However, in the electronic device 100 in this embodiment, it is assumed that the function of an IC or a module forming the wireless communication unit 110 is not stopped in the first mode MD1. That is, it is assumed that the electronic device 100 can acquire direction information, described later, even in the first mode MD1. Similarly, it is assumed that the processing unit 130 can execute processing described later with reference to FIG. 2 and onward, even in the first mode MD1. The first mode MD1 also includes a case where the supply of power to other functions than a predetermined function is limited while the predetermined function is in operation. Specifically, for example, a mode where the backlight of the touch panel, not illustrated, is switched off during the execution of a job by the electronic device 100 is the first mode MD1. In order to start a function for causing the electronic device 100 to execute a job, the electronic device 100 needs to be operating in the second mode MD2.

The wireless communication unit 110 is a communication interface performing wireless communication conforming to a predetermined wireless communication standard. The wireless communication unit 110 can be implemented, for example, by hardware for communication such as an ASIC (application-specific integrated circuit) for communication or a processor for communication, and firmware for communication or the like. In this embodiment, the processing unit 130, described later, performs communication control processing such as transmission processing and reception processing for information, to the wireless communication unit 110, and thus enables the wireless communication unit 110 to transmit information to an external device such as the information processing device 200 and to receive information from the external device. As the predetermined wireless communication standard, a plurality of types may be employed. That is, the wireless communication unit 110 includes hardware and firmware for communication or the like corresponding to a desired wireless communication standard.

The wireless communication unit 110 can perform wireless communication conforming to a short-range wireless communication standard such as Bluetooth (trademark registered), as the predetermined wireless communication standard. In this embodiment, Bluetooth includes BLE (Bluetooth Low Energy) and may be simply referred to as BLE in the description below. That is, both the wireless communication unit 110 of the electronic device 100 and the information processing device 200 in this embodiment include a BLE communication unit, not illustrated. Thus, BLE communication can be implemented between the electronic device 100 and the information processing device 200. The BLE communication unit is in conformity with the standard of Bluetooth from version 5.1 onward. In other words, each unit included in the electronic device 100 and the information processing device 200 in this embodiment is in conformity with the standard of Bluetooth from version 5.1 onward.

The wireless communication unit 110 may also perform wireless communication conforming to another wireless communication standard. The another wireless communication standard is, for example, a Wi-Fi (trademark registered) wireless communication or the like. The wireless communication unit 110 may also perform wireless communication in a predetermined connection mode conforming to Wi-Fi. The predetermined connection mode is, for example, a Wi-Fi infrastructure mode, an ad-hoc mode, a Wi-Fi Direct (trademark registered) mode or the like but may be other connection modes. Wi-Fi Direct can also be referred to as direct connection. Each predetermined connection mode can be arbitrarily enabled or disabled.

The control unit 112 controls the input and output of data from and to each functional unit including the wireless communication unit 110. For example, the control unit 112 executes various kinds of computational processing, based on a predetermined program read out from a memory, not illustrated, an operation input signal from the operation unit 140, or various data or the like received via the wireless communication unit 110, and controls a display output operation to, for example, a display unit, not illustrated. The predetermined program refers to, for example, basic software such as an OS (operating system), various application programs operating based on the basic software, or both of these, or the like.

The control unit 112 can be implemented by a processor. That is, each processing in this embodiment can be implemented by a processor operating based on information such as a program, and a memory, not illustrated, storing information such as a program. The processor may be, for example, individual pieces of hardware implementing functions of individual units or may be a unified piece of hardware implementing functions of individual units. For example, the processor includes hardware and the hardware can include at least one of a circuit processing a digital signal and a circuit processing an analog signal. For example, the processor can also be formed of one or a plurality of circuit devices or one or a plurality of circuit elements installed on a circuit board. The processor may be, for example, a CPU (central processing unit). However, the processor is not limited to a CPU. Various processors such as a GPU (graphics processing unit) or a DSP (digital signal processor) can be used. The processor may also be a hardware circuit formed of an ASIC. The processor may also include an amplifier circuit and a filter circuit or the like processing an analog signal.

The control unit 112 in this embodiment includes a direction information acquisition unit 120 and the processing unit 130. That is, the electronic device 100 in this embodiment includes the direction information acquisition unit 120 and the processing unit 130. For example, the control unit 112 reads out and executes a mode control program, described later, from a memory, not illustrated, and thus implements the functions of the direction information acquisition unit 120 and the processing unit 130. When the operation of the mode control program needs basic software that serves as a base, the control unit 112 may read out the program of the basic software from the memory, not illustrated, and thus may be able to implement a function, for example, as the processing unit 130.

The direction information acquisition unit 120 acquires direction information about the direction of the information processing device 200 in relation to a reference location of the electronic device 100 by the wireless communication with the information processing device 200 via the wireless communication unit 110. The acquisition of the direction information can be implemented, for example, by a technique described below. For example, it is assumed that the BLE communication unit of the information processing device 200 broadcasts a BLE advertisement packet, as described above, and that the BLE communication unit of the wireless communication unit 110 receiving this advertisement packet includes a plurality of reception antennas. In this case, the advertisement packet reaches the individual reception antennas with a time difference. Therefore, the angle of arrival AOA of the radio wave can be estimated, based on a first computation technique using the distance between the individual antennas and the wavelength of the radio wave, which are known. That is, the reference location of the electronic device 100 is, for example, the location where the antenna of the BLE communication unit of the wireless communication unit 110 is located, though not illustrated. The technique for estimating the angle of arrival AOA including the first computation technique is known and therefore is not described further in detail here.

The acquisition of the direction information may also be implemented, for example, by a technique described below. The BLE communication unit of the information processing device 200 includes a plurality of transmission antennas and broadcasts a BLE advertisement packet while shifting the timing of transmitting the radio wave from each transmission antenna. In this case, this advertisement packet includes information of the timing when each transmission antenna transmits the advertisement packet and distance information between the individual transmission antennas. The BLE communication unit of the wireless communication unit 110 can estimate the angle of departure AOD of the radio wave, based on a second computation technique using the phase difference between the advertisement packets received from the individual transmission antennas, and the information of the transmission timing and the distance information between the transmission antennas included in the advertisement packet. The technique for estimating the angle of departure AOD including the second computation technique is known and therefore is not described further in detail here.

The processing unit 130 can execute first transition processing (step S100) of a transition from the first mode MD1 to the second mode MD2, based on the direction information, by a technique described later with reference to FIG. 2 and onward. The processing unit 130 can also execute second transition processing (step S200) of a transition from the second mode MD2 to the first mode MD1, based on the direction information. The processing unit 130 may execute both or one of the first transition processing (step S100) and the second transition processing (step S200). For example, the processing unit 130 can function as the mode control program and thus can implement the first transition processing (step S100) or the second transition processing (step S200). The processing unit 130 may also function as basic software or the like that serves as a base for the mode control program. The function as the basic software or the like is, for example, the function of converting azimuth information acquired based on a geomagnetic sensor or a gyro sensor, not illustrated, into information used in each processing of the mode control program, described later, or the like.

Figure 2:
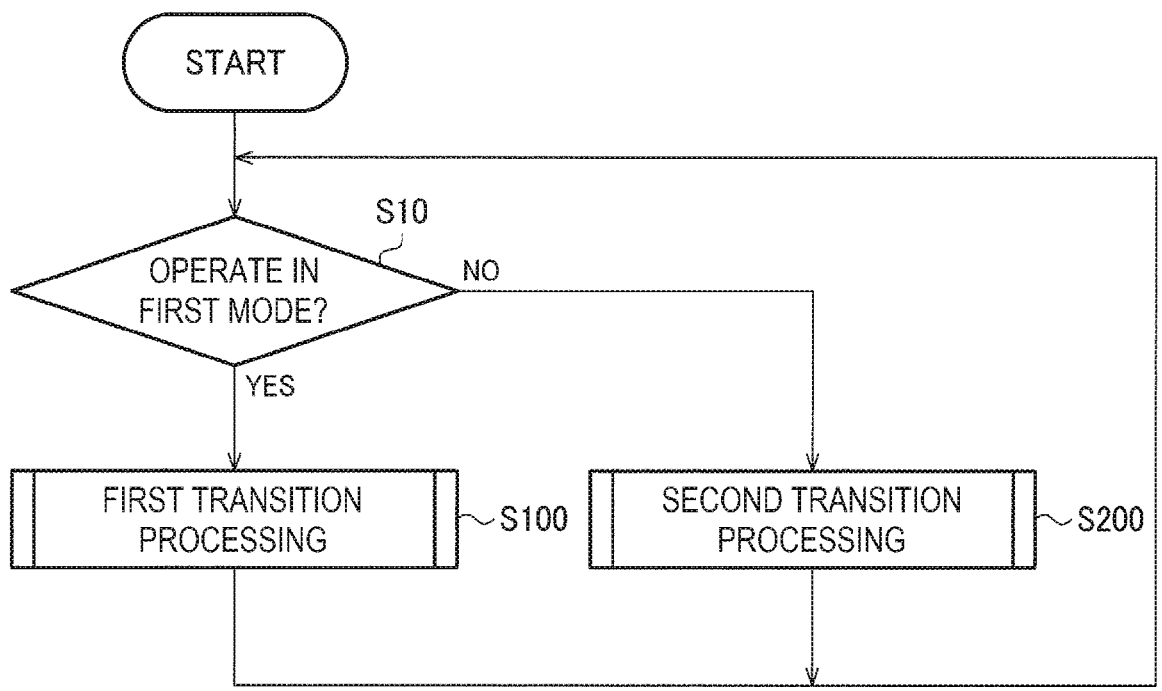
FIG. 2 is a flowchart explaining an example of processing by the electronic device.

FIG. 2 is a flowchart explaining a processing example according to the mode control program in this embodiment. The processing shown in FIG. 2 is illustrated as loop processing after the start of the boot program of the electronic device 100 but may also be, for example, timer interrupt processing executed every predetermined time. The processing unit 130 executes processing of determining whether the electronic device 100 is operating in the first mode MD1 or not (step S10). When the processing unit 130 has determined that the electronic device 100 is operating in the first mode MD1 (YES in step S10), the processing unit 130 executes the first transition processing (step S100) and executes step S10 again. Meanwhile, when the processing unit 130 has determined that the electronic device 100 is operating in the second mode MD2 (NO in step S10), the processing unit 130 executes the second transition processing (step S200) and executes step S10 again.

For example, it is assumed that there is an electronic device 100 that is approached by the user of the electronic device 100 from a predetermined direction without exception for a predetermined reason, though not illustrated. The predetermined reason is, for example, that the electronic device 100 is arranged in a corner on a predetermined floor or that a wall or another device is arranged in other directions than the predetermined direction, or the like. It is also assumed that the user of the electronic device 100 constantly holds the information processing device 200. In this case, the processing unit 130 in the first transition processing (step S100) determines whether the predetermined direction is the same as the direction based on the direction information acquired by the direction information acquisition unit 120 or not. In this case, "the same" includes "substantially the same". When the processing unit 130 has determined that the predetermined direction is the same as the direction based on the direction information acquired by the direction information acquisition unit 120, the processing unit 130 determines that it is a circumstance where the user wants to use the electronic device 100 because the user is approaching the electronic device 100. The processing unit 130 then executes processing of making a transition from the first mode MD1 to the second mode MD2 because causing the electronic device 100 to operate in the first mode MD1 in this circumstance is not appropriate for the execution of a job.

The processing unit 130 in the second transition processing (step S200) also determines whether the predetermined direction is the same as the direction information acquired by the direction information acquisition unit 120 or not. When the processing unit 130 has determined that the predetermined direction is not the same as the direction information acquired by the direction information acquisition unit 120, the processing unit 130 determines that it is a circumstance where the user has finished the use of the electronic device 100 because the user is moving away from the electronic device 100. The processing unit 130 then executes processing of making a transition from the second mode MD2 to the first mode MD1 because causing the electronic device 100 to operate in the second mode MD2 in this circumstance is not appropriate in view of power consumption.

In the flow shown in FIG. 2, loop processing where either the first transition processing (step S100) or the second transition processing (step S200) is executed without fail is employed. However, loop processing where only one of the first transition processing (step S100) and the second transition processing (step S200) is executed may be employed. For example, processing of executing step S10 again when NO in step S10 in FIG. 2 may be employed, thus generating a flow where the first transition processing (step S100) is executed whereas the second transition processing (step S200) is not executed, though not illustrated. Similarly, processing of executing step S10 again when YES in step S10 in FIG. 2 may be employed, thus generating a flow where the second transition processing (step S200) is executed whereas the first transition processing (step S100) is not executed.

As described above, the electronic device 100 in this embodiment wirelessly communicates with the information processing device 200 via the wireless communication unit 110 and can operate at least in the first mode MD1 and in the second mode MD2, which is a state where the power consumption is higher than in the first mode MD1. The electronic device 100 includes the direction information acquisition unit 120 and the processing unit 130. The direction information acquisition unit 120 acquires direction information about the direction of the information processing device 200 in relation to the reference location of the electronic device 100 by the wireless communication with the information processing device 200 via the wireless communication unit 110. The processing unit 130 performs at least one of a transition from the first mode MD1 to the second mode MD2 and a transition from the second mode MD2 to the first mode MD1, based on the direction information.

In this way, the electronic device 100 in this embodiment can operate in the first mode MD1 and in the second mode MD2, which is a state where the power consumption is higher than in the first mode MD1. Therefore, the electronic device 100 can avoid operating constantly in the second mode MD2. Thus, the electronic device 100 can properly consume power. Also, the electronic device 100 in this embodiment includes the direction information acquisition unit 120 and therefore can acquire the direction information of the information processing device 200. Also, the electronic device 100 in this embodiment includes the processing unit 130 and therefore can control the mode of the electronic device 100, based on the direction information. Thus, the mode transition of the electronic device 100 can be performed at a more proper timing.

Up to this point, the electronic device 100 controlling the mode transition of the electronic device 100, based on the direction information, has not been proposed. For example, if the electronic device 100 operating in the first mode MD1 continues operating in the first mode MD1 until the user actually operates the electronic device 100, the period until the transition from the first mode MD1 to the second mode MD2 is completed is a time loss for the user. Also, for example, if the electronic device 100 maintains the second mode MD2 even when the user is located at a location away from the electronic device 100 after finishing the use of the electronic device 100, it is wasteful in view of power consumption. Moreover, to control the state of the electronic device 100 using a sensor or the like, a component such as a sensor needs to be prepared separately and this is costly and takes time and effort. In this respect, applying the technique in this embodiment enables the execution of the mode transition of the electronic device 100 at a more proper timing without increasing the number of components. Thus, the convenience of the electronic device 100 can be enhanced. For example, the electronic device 100 can be made to operate in the second mode MD2 at a timing when the user arrives at the location where the electronic device 100 is located. Therefore, the time taken for the user to use the electronic device 100 can be reduced. Also, for example, the electronic device 100 can be made to operate in the first mode MD1 at a timing when the user does not use the electronic device 100. Therefore, the power consumption of the electronic device 100 can be restrained.

The technique in this embodiment may be implemented by a processing method. That is, the processing method in this embodiment includes processing of wirelessly communicating with the information processing device 200, processing of causing the electronic device 100 to operate at least in the first mode MD1 and in the second mode MD2, which is a state where the power consumption is higher than in the first mode MD1, and processing of acquiring direction information about the direction of the information processing device 200 in relation to the reference location of the electronic device 100 by the wireless communication with the information processing device 200. The processing method in this embodiment also includes at least one of processing of performing a transition from the first mode MD1 to the second mode MD2 and processing of performing a transition from the second mode MD2 to the first mode MD1, based on the direction information. Thus, effects similar to the above can be achieved.

The technique in this embodiment may be implemented by a program. That is, the program in this embodiment is used for the electronic device 100 that wirelessly communicates with the information processing device 200 via the wireless communication unit 110 and that can operate at least in the first mode MD1 and in the second mode MD2, which is a state where the power consumption is higher than in the first mode MD1. The program causes a computer to function as the direction information acquisition unit 120 and the processing unit 130. The direction information acquisition unit 120 acquires direction information about the direction of the information processing device 200 in relation to the reference location of the electronic device 100 by the wireless communication with the information processing device 200 via the wireless communication unit 110. The processing unit 130 performs at least one of a transition from the first mode MD1 to the second mode MD2 and a transition from the second mode MD2 to the first mode MD1, based on the direction information acquired by the direction information acquisition unit 120. Thus, effects similar to the above can be achieved.

Figure 4:
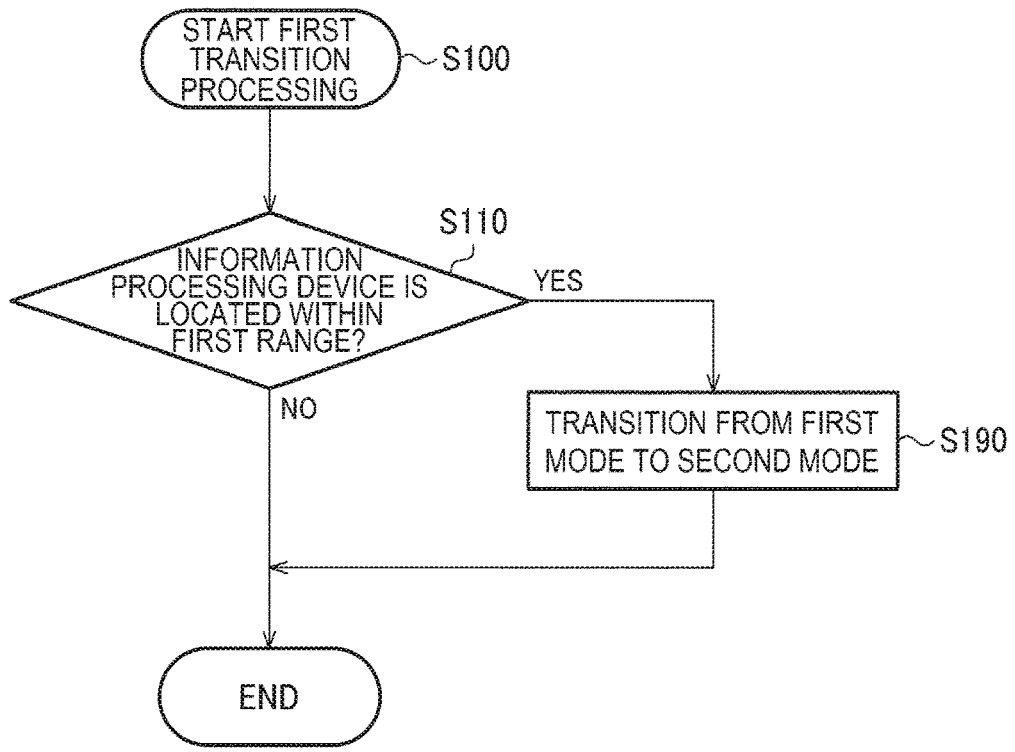
FIG. 4 is a flowchart explaining a processing example of first transition processing.
Figure 5:
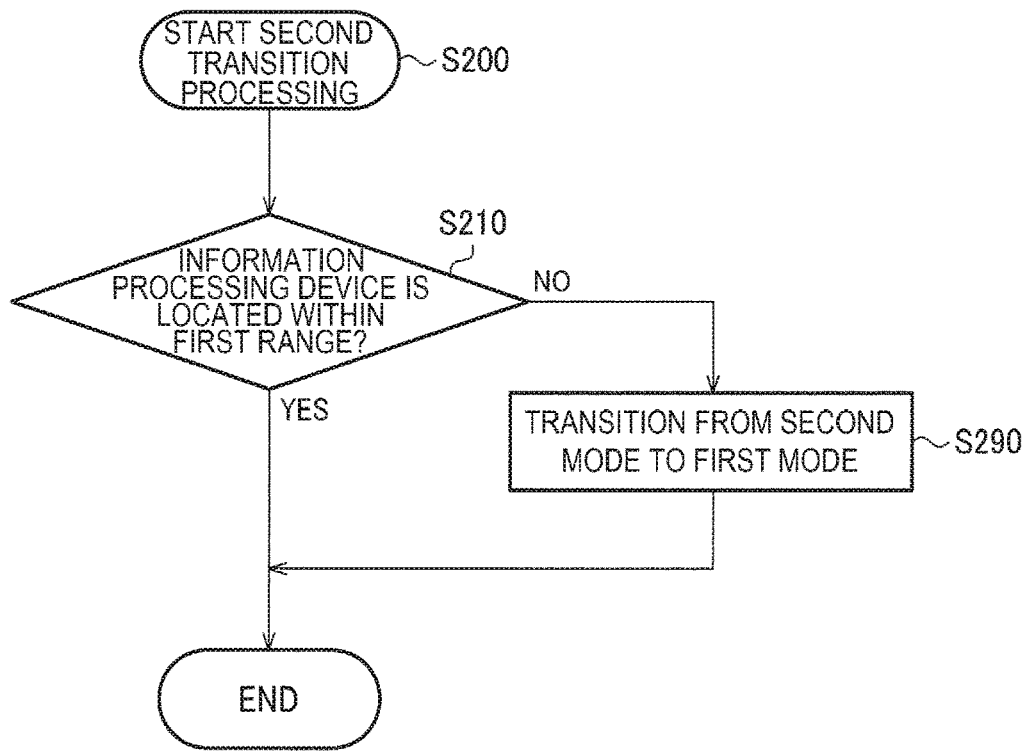
FIG. 5 is a flowchart explaining a processing example of second transition processing.

The technique in this embodiment is not limited to the above and can be implemented with various modifications. For example, the electronic device 100 in this embodiment may execute processing of determining whether the information processing device 200 is located in a first range, described later, or not. More specifically, the first transition processing (step S100) and the second transition processing (step S200) shown in FIG. 2 are not limited to the above and may be configured, for example, as shown in FIGS. 4 and 5. In the description below, the Bluetooth standard is employed as an example of the wireless communication standard. That is, in the electronic device 100 in this embodiment, the wireless communication standard is the Bluetooth standard and the processing unit 130 performs at least one of a transition from the first mode MD1 to the second mode MD2 and a transition from the second mode MD2 to the first mode MD1, based on a beacon signal conforming to the Bluetooth standard detected by the wireless communication unit 110. Thus, a system for controlling the mode of the electronic device 100 can be constructed, using Bluetooth.

Figure 3:
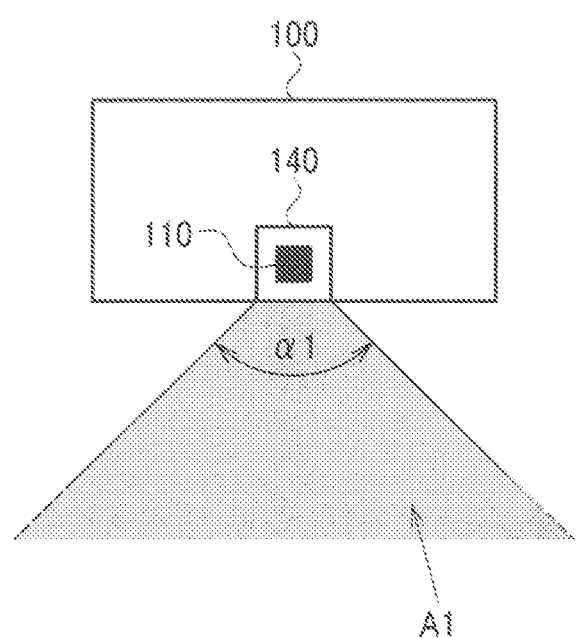
FIG. 3 explains a first range.

The first range will now be described, using FIG. 3. FIG. 3 schematically shows the electronic device 100 and the like, as viewed from above. The electronic device 100 may include the operation unit 140, as described above. Specifically, on a substrate including a touch panel, an operation button or the like functioning as the operation unit 140, hardware for wireless communication functioning as the wireless communication unit 110 is installed through a mounting process. In this way, in the electronic device 100 in this embodiment, the wireless communication unit 110 is provided at the place where the operation unit 140 is installed. Thus, the wireless communication unit 110 and the operation unit 140 share the location and the user can grasp the location of the wireless communication unit 110 from outside the electronic device 100. Therefore, the user can grasp the reference location from outside the electronic device 100. That is, the place where the operation unit 140 is installed is the place where the substrate on which the device forming the operation unit 140 is mounted is installed, in the electronic device 100. The operation unit 140 is provided in a front direction of the electronic device 100. The front direction of the electronic device 100 is a direction from the electronic device 100 toward a location where the user is usually expected to be located when using the electronic device 100.

As indicated by A1 in FIG. 3, a direction range of a first angle α1 including the front direction, taking an antenna, not illustrated, included in the BLE communication unit of the wireless communication unit 110, as a reference point, is defined as the first range. Based on the above description, in the electronic device 100 in this embodiment, the reference location is the location of the operation unit 140 and the first range is the direction range including the front direction from the operation unit 140. Thus, the processing unit 130 can control the state of the electronic device 100, based on the direction information taking the front side of the operation unit 140 as a reference point. Thus, the execution of an unnecessary mode transition can be prevented. The unnecessary mode transition is, for example, a transition from the first mode MD1 to the second mode MD2 when the user is located in the direction opposite to the operation unit 140, or the like.

FIG. 4 is a flowchart explaining a processing example of the first transition processing (step S100). The processing unit 130 executes processing of determining whether the information processing device 200 is located within the first range or not (step S110). When the processing unit 130 has determined that the information processing device 200 is located within the first range (YES in step S110), the processing unit 130 executes processing of performing a transition from the first mode MD1 to the second mode MD2 (step S190) and ends the flow. Meanwhile, when the processing unit 130 has determined that the information processing device 200 is not located within the first range (NO in step S110), the processing unit 130 ends the flow.

As described above, in the electronic device 100 in this embodiment, the processing unit 130 performs a transition from the first mode MD1 to the second mode MD2 when it is determined that the information processing device 200 is located within the first range, which is the direction range of the first angle α1, which is the predetermined angle from the reference location, while the electronic device 100 is operating in the first mode MD1. Thus, the processing unit 130 can perform a transition to the second mode MD2, where the user can use the electronic device 100, after grasping that the user is close enough to be within the direction range of the predetermined angle to the electronic device 100.

FIG. 5 is a flowchart explaining a processing example of the second transition processing (step S200). The processing unit 130 executes processing of determining whether the information processing device 200 is located within the first range or not (step S210). When the processing unit 130 has determined that the information processing device 200 is not located within the first range (NO in step S210), the processing unit 130 executes processing of performing a transition from the second mode MD2 to the first mode MD1 (step S290) and ends the flow. Meanwhile, when the processing unit 130 has determined that the information processing device 200 is located within the first range (YES in step S210), the processing unit 130 ends the flow.

As described above, in the electronic device 100 in this embodiment, the processing unit 130 performs a transition from the second mode MD2 to the first mode MD1 when it is determined that the information processing device 200 is not located within the first range, which is the direction range of the first angle α1, which is the predetermined angle from the reference location, while the electronic device 100 is operating in the second mode MD2. Thus, the processing unit 130 can perform a transition to the first mode MD1 with lower power consumption, after grasping that the user is not located in the direction range of the predetermined angle to the electronic device 100.

The technique in this embodiment is not limited to the above and can be implemented with various modifications. For example, the first transition processing (step S100) may be executed as in a processing example shown in the flowchart of FIG. 6. The processing unit 130 executes processing of determining whether the information processing device 200 is located within the first range or not (step S110). When the processing unit 130 has determined that the information processing device 200 is located within the first range (YES in step S110), the processing unit 130 executes processing of determining whether the information processing device 200 has been staying within the first range for a first predetermined time or longer, or not (step S120). Meanwhile, when the processing unit 130 has determined that the information processing device 200 is not located within the first range (NO in step S110), the processing unit 130 ends the flow. When the processing unit 130 has determined that the information processing device 200 has been staying within the first range for the first predetermined time or longer (YES in step S120), the processing unit 130 executes processing of performing a transition from the first mode MD1 to the second mode MD2 (step S190) and ends the flow. Meanwhile, when the processing unit 130 has determined that the time for which the information processing device 200 has been staying within the first range is less than the first predetermined time (NO in step S120), the processing unit 130 ends the flow.

Figure 13:
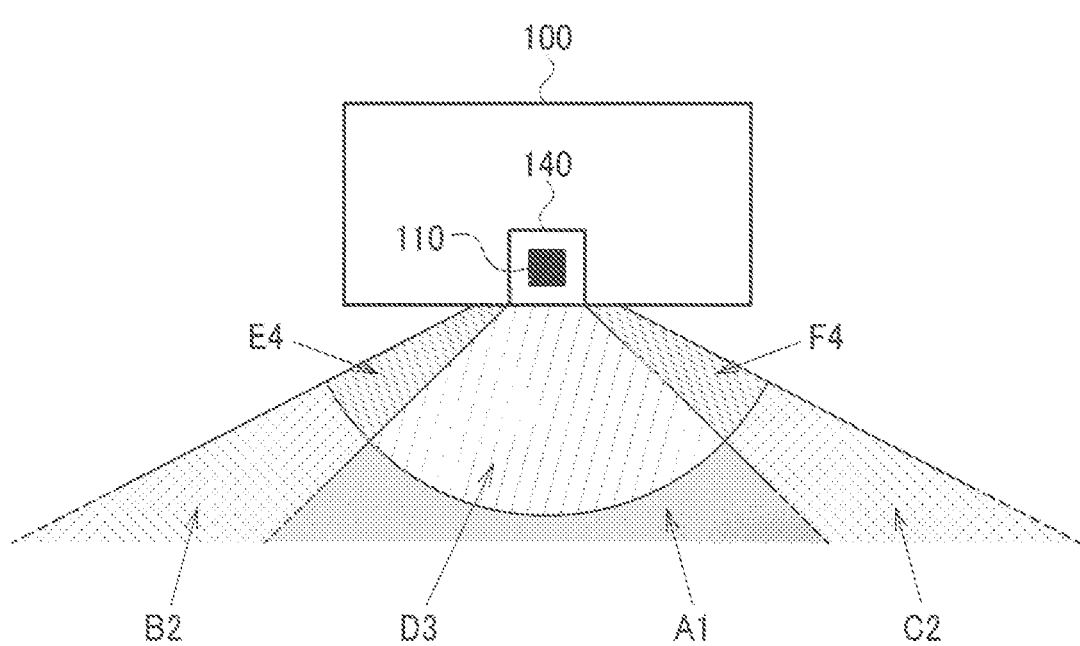
FIG. 13 explains a third range.

As the first predetermined time in step S120, a plurality of types may be provided according to the location in the first range. For example, the first predetermined time may differ between when the information processing device 200 is located at a location within a predetermined distance from the electronic device 100, in the first range, and when the information processing device 200 is located at a location at the predetermined distance or farther from the electronic device 100, though not illustrated. For example, the first predetermined time corresponding to when the information processing device 200 is located at a location within the predetermined distance from the electronic device 100 may be set to be shorter than the first predetermined time corresponding to when the information processing device 200 is located at a location at the predetermined distance or farther from the electronic device 100. Whether the information processing device 200 is within the predetermined distance or not can be grasped, for example, using information of BLE radio wave intensity or the like, and this will be described in detail later with reference to FIG. 13. As described above, in the electronic device 100 in this embodiment, the processing unit 130 performs a transition from the first mode MD1 to the second mode MD2 when the stay time of the information processing device 200 in the first range is equal to or longer than the first predetermined time while the electronic device 100 is operating in the first mode MD1. The first predetermined time varies depending on the location where the information processing device 200 is located. Thus, the processing unit 130 can perform a transition from the first mode MD1 to the second mode MD2 at a more proper timing.

Figure 7:
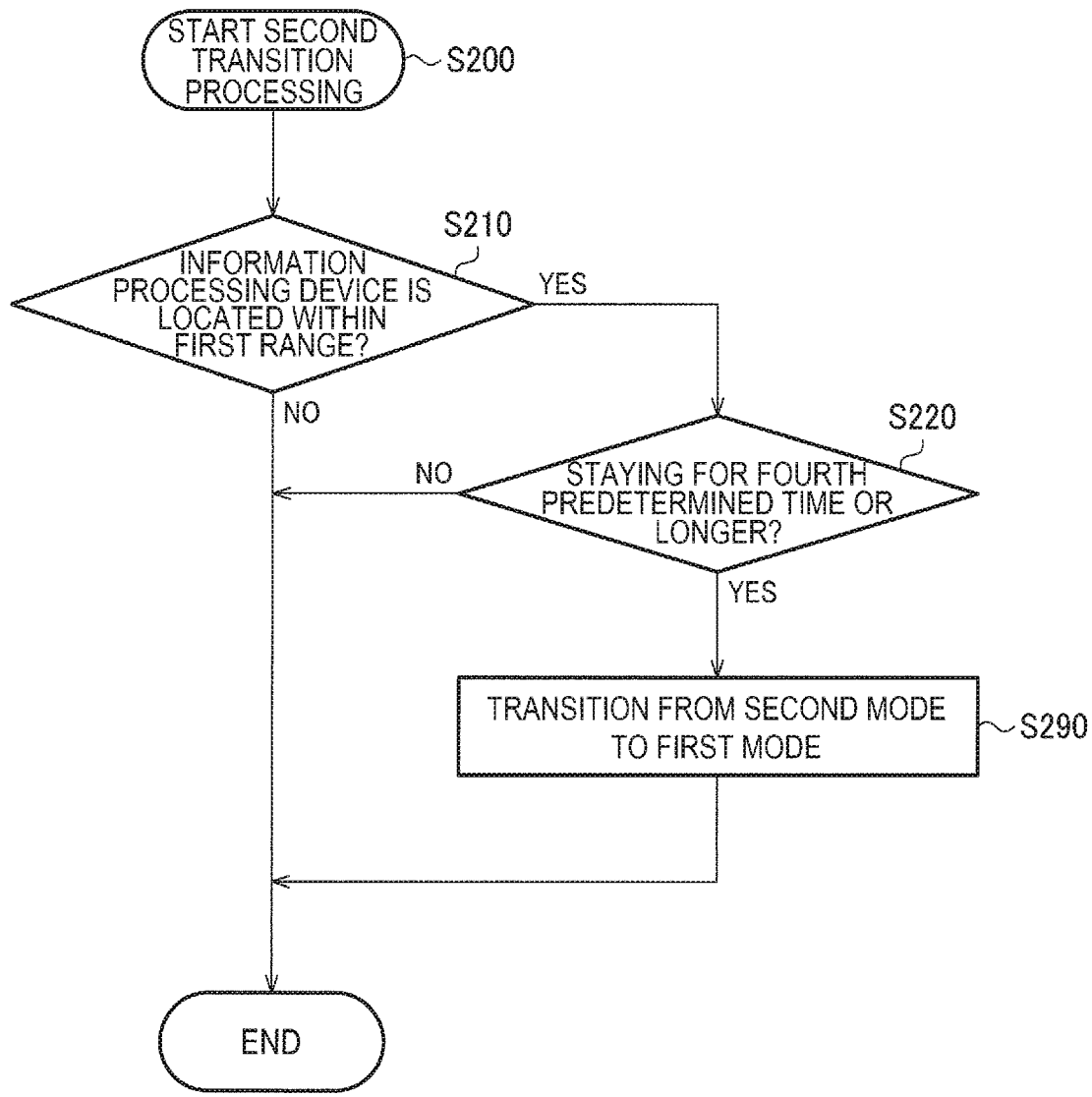
FIG. 7 is a flowchart explaining another processing example of the second transition processing.

Similarly, for example, the second transition processing (step S200) may be executed as in a processing example shown in the flowchart of FIG. 7. The processing unit 130 executes processing of determining whether the information processing device 200 is located within the first range or not (step S210). When the processing unit 130 has determined that the information processing device 200 is located within the first range (YES in step S210), the processing unit 130 executes processing of determining whether the information processing device 200 has been staying within the first range for a fourth predetermined time or longer, or not (step S220). Meanwhile, when the processing unit 130 has determined that the information processing device 200 is not located within the first range (NO in step S210), the processing unit 130 ends the flow. When the processing unit 130 has determined that the information processing device 200 has been staying within the first range for the fourth predetermined time or longer (YES in step S220), the processing unit 130 executes processing of performing a transition from the second mode MD2 to the first mode MD1 (step S290) and ends the flow. Meanwhile, when the processing unit 130 has determined that the time for which the information processing device 200 has been staying within the first range is less than the fourth predetermined time (NO in step S220), the processing unit 130 ends the flow.

Figure 6:
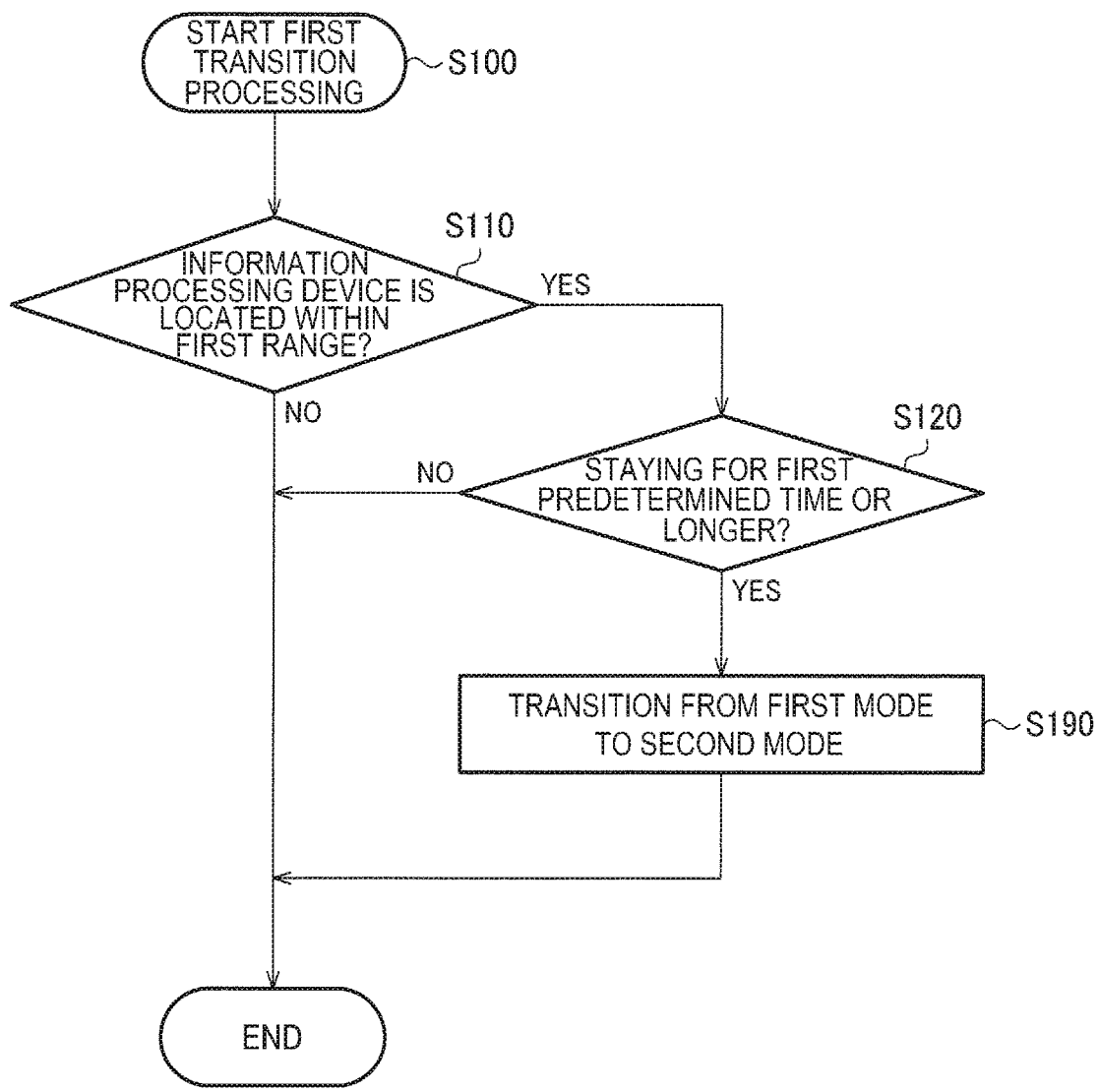
FIG. 6 is a flowchart explaining another processing example of the first transition processing.

The user can suitably set the first predetermined time in FIG. 6 and the fourth predetermined time in FIG. 7. However, it is desirable that the fourth predetermined time is set to be longer than the first predetermined time. This is because, when the user is located in the first range, the user is highly likely to be using the electronic device 100 and therefore it is desirable that the fourth predetermined time, which is the time until a transition to the first mode MD1 with lower power consumption is performed, is set to be long. For example, the fourth predetermined time is set based on an average duration for which the user uses the electronic device 100 at a time.

As the fourth predetermined time in step S220, similarly, a plurality of types may be provided according to the location in the first range. For example, the fourth predetermined time may differ between when the information processing device 200 is located at a location within a predetermined distance from the electronic device 100, in the first range, and when the information processing device 200 is located at a location at the predetermined distance or farther from the electronic device 100, though not illustrated. For example, the fourth predetermined time corresponding to when the information processing device 200 is located at a location within the predetermined distance from the electronic device 100 may be set to be longer than the fourth predetermined time corresponding to when the information processing device 200 is located at a location at the predetermined distance or farther from the electronic device 100. As described above, in the electronic device 100 in this embodiment, the processing unit 130 performs a transition from the second mode MD2 to the first mode MD1 after the stay time of the information processing device 200 in the first range is equal to or longer than the fourth predetermined time while the electronic device 100 is operating in the second mode MD2. The fourth predetermined time varies depending on the location where the information processing device 200 is located. Thus, the processing unit 130 can perform a transition from the second mode MD2 to the first mode MD1 at a more proper timing.

Figure 8:
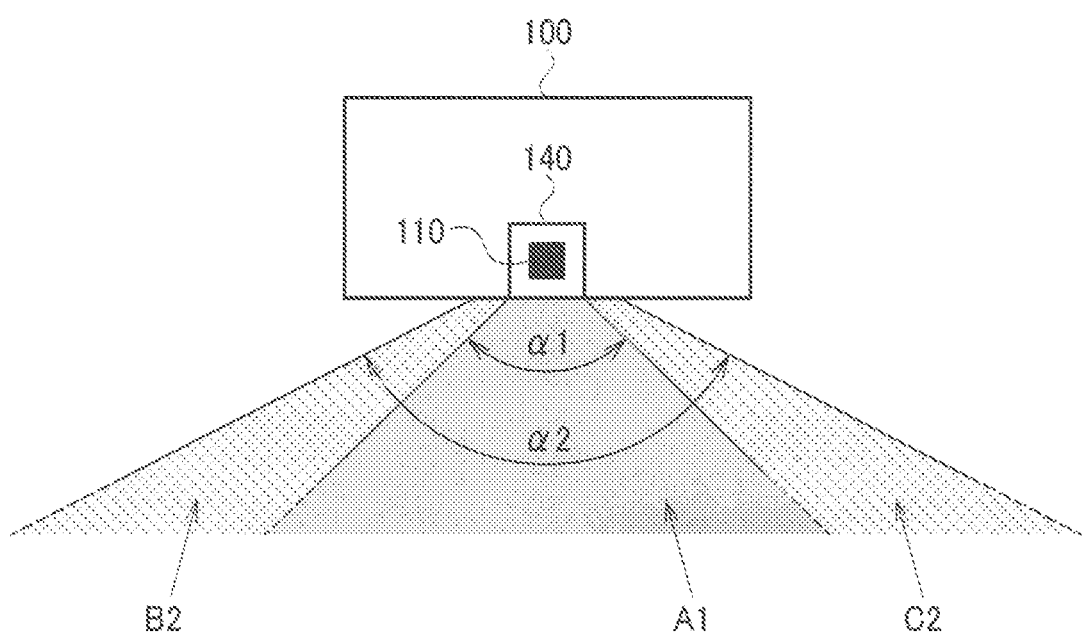
FIG. 8 explains a second range.

The technique in this embodiment is not limited to the above and can be implemented with various modifications. For example, while the processing examples using the first range are described with reference to FIGS. 3 to 7, these processing examples are not limiting. For example, a processing example using a second range as well may be employed. The second range is, for example, a direction range of a second angle $\alpha 2$ larger than the first angle $\alpha 1$ from the reference location and excluding the first range indicated by A1, as indicated by B2, C2 in FIG. 8.

Figure 9:
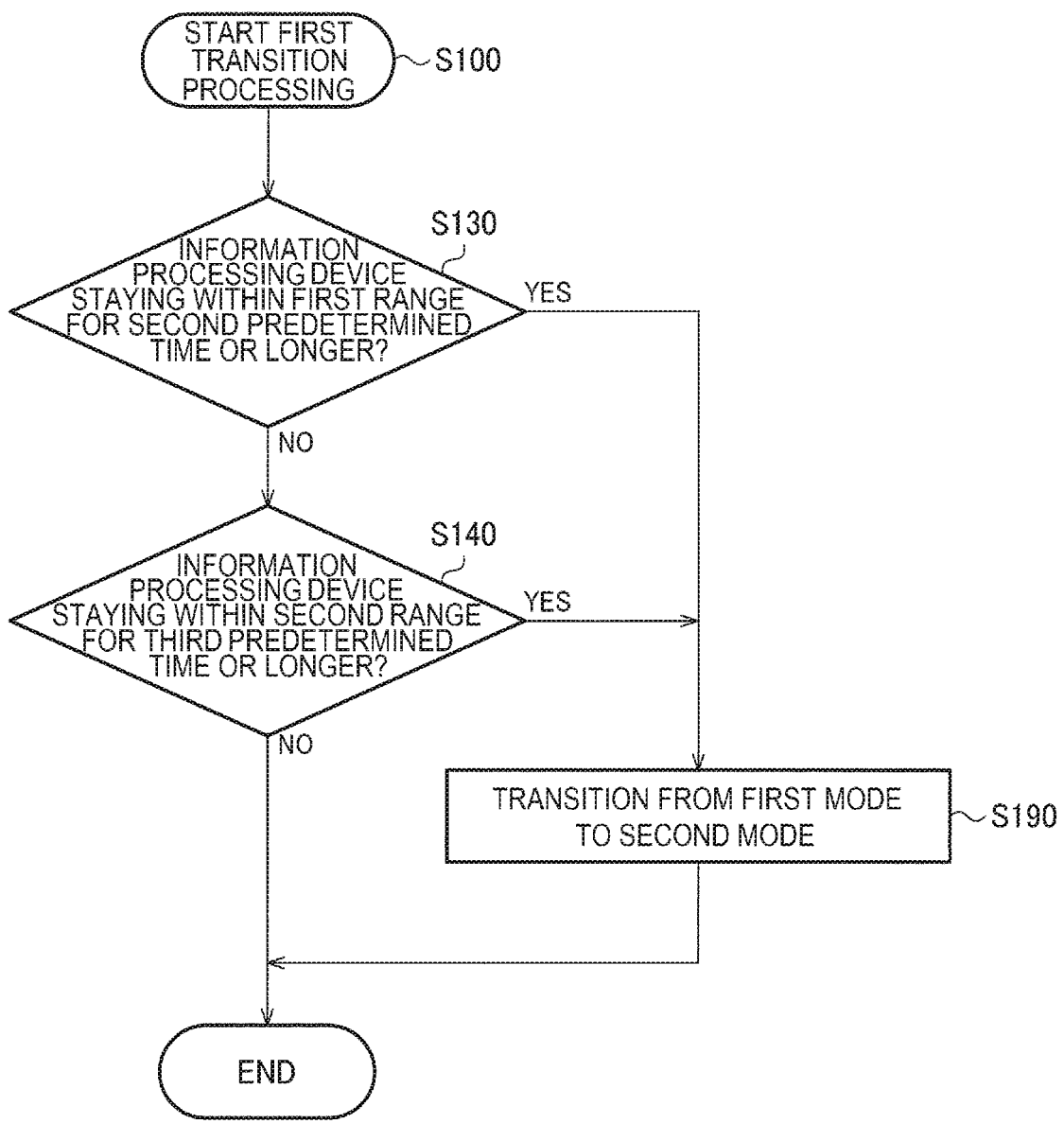
FIG. 9 is a flowchart explaining another processing example of the first transition processing.

Specifically, for example, the first transition processing (step S100) may be executed as in a processing example shown in the flowchart of FIG. 9. The processing unit 130 executes processing of determining whether the information processing device 200 has been staying within the first range for a second predetermined time or longer, or not (step S130). For example, the processing unit 130 executes processing of causing a first timer counter to count at the time point when it is determined that the angle based on the direction information acquired by the direction information acquisition unit 120 is the direction range of the first angle α1. The processing unit 130 then executes processing of determining whether the count value of the first timer counter has reached a first predetermined count value or not. The processing unit 130 can thus implement step S130. When the angle based on the direction information acquired by the direction information acquisition unit 120 is out of the direction range of the first angle α1, the processing unit 130 resets the count value of the first timer counter.

When the processing unit 130 has determined that the information processing device 200 has been staying within the first range for the second predetermined time or longer (YES in step S130), the processing unit 130 executes processing of performing a transition from the first mode MD1 to the second mode MD2 (step S190) and ends the flow. Meanwhile, when the processing unit 130 has determined that the time for which the information processing device 200 has been staying within the first range is less than the second predetermined time (NO in step S130), the processing unit 130 executes processing of determining whether the information processing device 200 has been staying within the second range for a third predetermined time or longer, or not (step S140). For example, the processing unit 130 executes processing of causing a second timer counter to count at the time point when it is determined that the angle based on the direction information acquired by the direction information acquisition unit 120 is the direction range of the second angle α2 and is out of the direction range of the first angle α1. The processing unit 130 then executes processing of determining whether the count value of the second timer counter has reached a second predetermined count value or not. The processing unit 130 can thus implement step S140. When the angle based on the direction information acquired by the direction information acquisition unit 120 is out of the direction range of the second angle α2, the processing unit 130 resets the count value of the second timer counter.

When the processing unit 130 has determined that the information processing device 200 has been staying within the second range for the third predetermined time or longer (YES in step S140), the processing unit 130 executes processing of performing a transition from the first mode MD1 to the second mode MD2 (step S190) and ends the flow. Meanwhile, when the processing unit 130 has determined that the time for which the information processing device 200 has been staying within the second range is less than the third predetermined time (NO in step S140), the processing unit 130 ends the flow.

The user can suitably set the second predetermined time in step S130 and the third predetermined time in step S140. However, it is desirable that the second predetermined time is set to be shorter than the third predetermined time. In other words, the third predetermined time is longer than the second predetermined time. This is because, when the user is located in the first range, the user is more likely to use the electronic device 100 than when the user is located in the second range and therefore it is desirable that the time until a transition to the second mode MD2, where the user can use the electronic device 100, is performed is set to be short.

As described above, in the electronic device 100 in this embodiment, the processing unit 130 performs a transition from the first mode MD1 to the second mode MD2 when the stay time for which the information processing device 200 is located in the first range is equal to or longer than the second predetermined time while the electronic device 100 is operating in the first mode MD1. Also, the processing unit 130 performs a transition from the first mode MD1 to the second mode MD2 when the stay time for which the information processing device 200 is located in the second range, which is a direction range of a broader angle from the reference location than the first range, is equal to or longer than the third predetermined time, which is longer than the second predetermined time, while the electronic device 100 is operating in the first mode MD1. Thus, the processing unit 130 can perform a transition from the first mode MD1 to the second mode MD2 at a more proper timing according to the location where the information processing device 200 is located.

Figure 10:
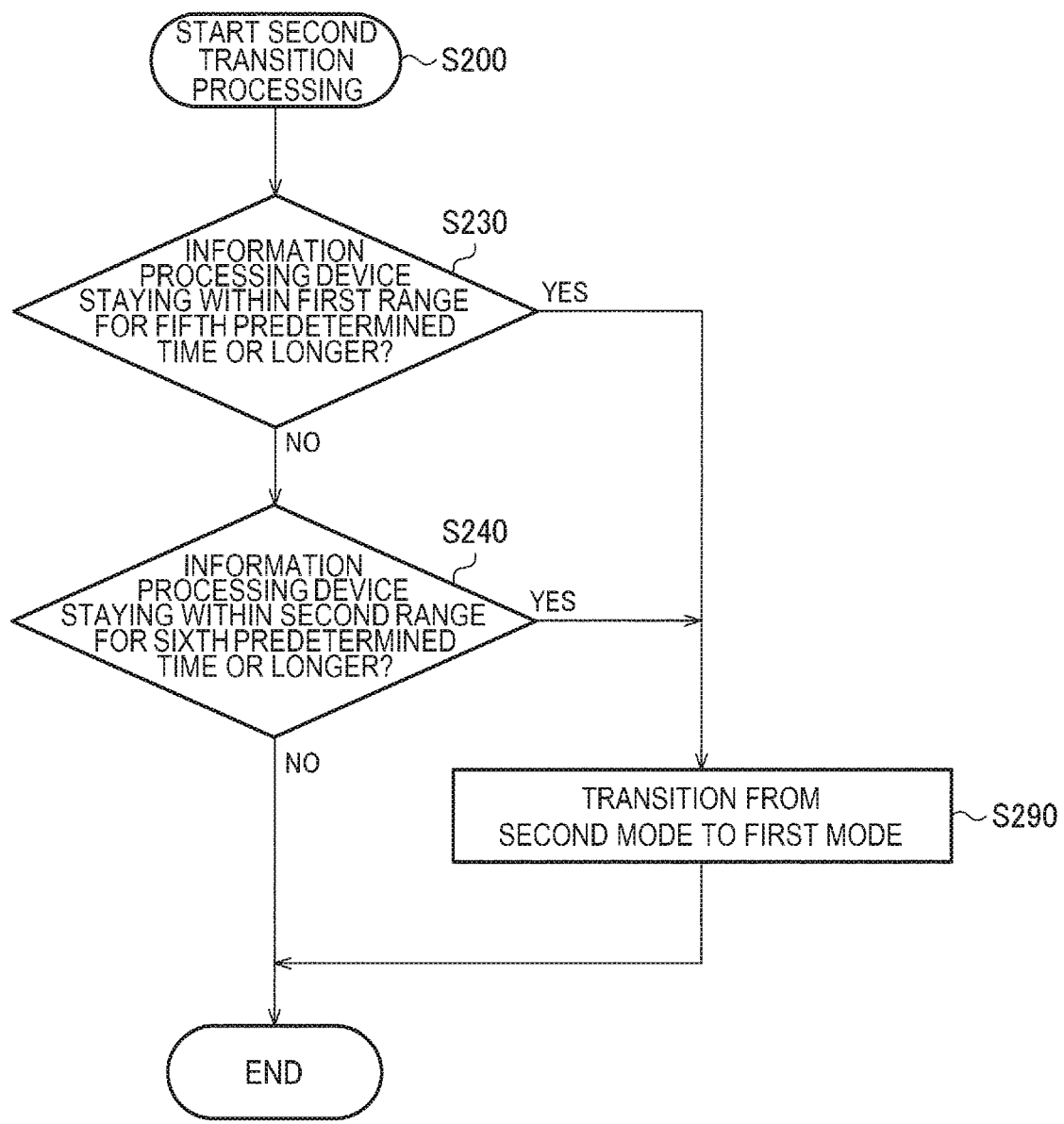
FIG. 10 is a flowchart explaining another processing example of the second transition processing.

Similarly, the second transition processing (step S200) may be executed as in a processing example shown in the flowchart of FIG. 10. The processing unit 130 executes processing of determining whether the information processing device 200 has been staying within the first range for a fifth predetermined time or longer, or not (step S230). When the processing unit 130 has determined that the information processing device 200 has been staying within the first range for the fifth predetermined time or longer (YES in step S230), the processing unit 130 executes processing of performing a transition from the second mode MD2 to the first mode MD1 (step S290) and ends the flow. Meanwhile, when the processing unit 130 has determined that the time for which the information processing device 200 has been staying within the first range is less than the fifth predetermined time (NO in step S230), the processing unit 130 executes processing of determining whether the information processing device 200 has been staying within the second range for a sixth predetermined time or longer, or not (step S240). When the processing unit 130 has determined that the information processing device 200 has been staying within the second range for the sixth predetermined time or longer (YES in step S240), the processing unit 130 executes processing of performing a transition from the second mode MD2 to the first mode MD1 (step S290) and ends the flow. Meanwhile, when the processing unit 130 has determined that the time for which the information processing device 200 has been staying within the second range is less than the sixth predetermined time (NO in step S240), the processing unit 130 ends the flow. Step S230 can be implemented by using a third timer counter similarly to the foregoing step S130. Step S240 can be implemented by using a fourth timer counter similarly to the foregoing step S140. Therefore, the implementation method is not described further in detail here.

The user can suitably set the fifth predetermined time in step S230 and the sixth predetermined time in step S240. However, it is desirable that the sixth predetermined time is set to be shorter than the fifth predetermined time. This is because, when the user is located in the second range, the user is more likely to have finished the use of the electronic device 100 than when the user is located in the first range and therefore it is desirable that the time until a transition to the first mode MD1 with lower power consumption is performed is short.

As described above, in the electronic device 100 in this embodiment, the processing unit 130 performs a transition from the second mode MD2 to the first mode MD1 when the stay time of the information processing device 200 in the first range is equal to or longer than the fifth predetermined time while the electronic device 100 is operating in the second mode MD2. Also, the processing unit 130 performs a transition from the second mode MD2 to the first mode MD1 when the stay time of the information processing device 200 in the second range, which is a direction range of a broader angle from the reference location than the first range, is equal to or longer than the sixth predetermined time, which is shorter than the fifth predetermined time, while the electronic device 100 is operating in the second mode MD2. Thus, the processing unit 130 can perform a transition from the second mode MD2 to the first mode MD1 at a more proper timing according to the location where the information processing device 200 is located.

Figure 11:
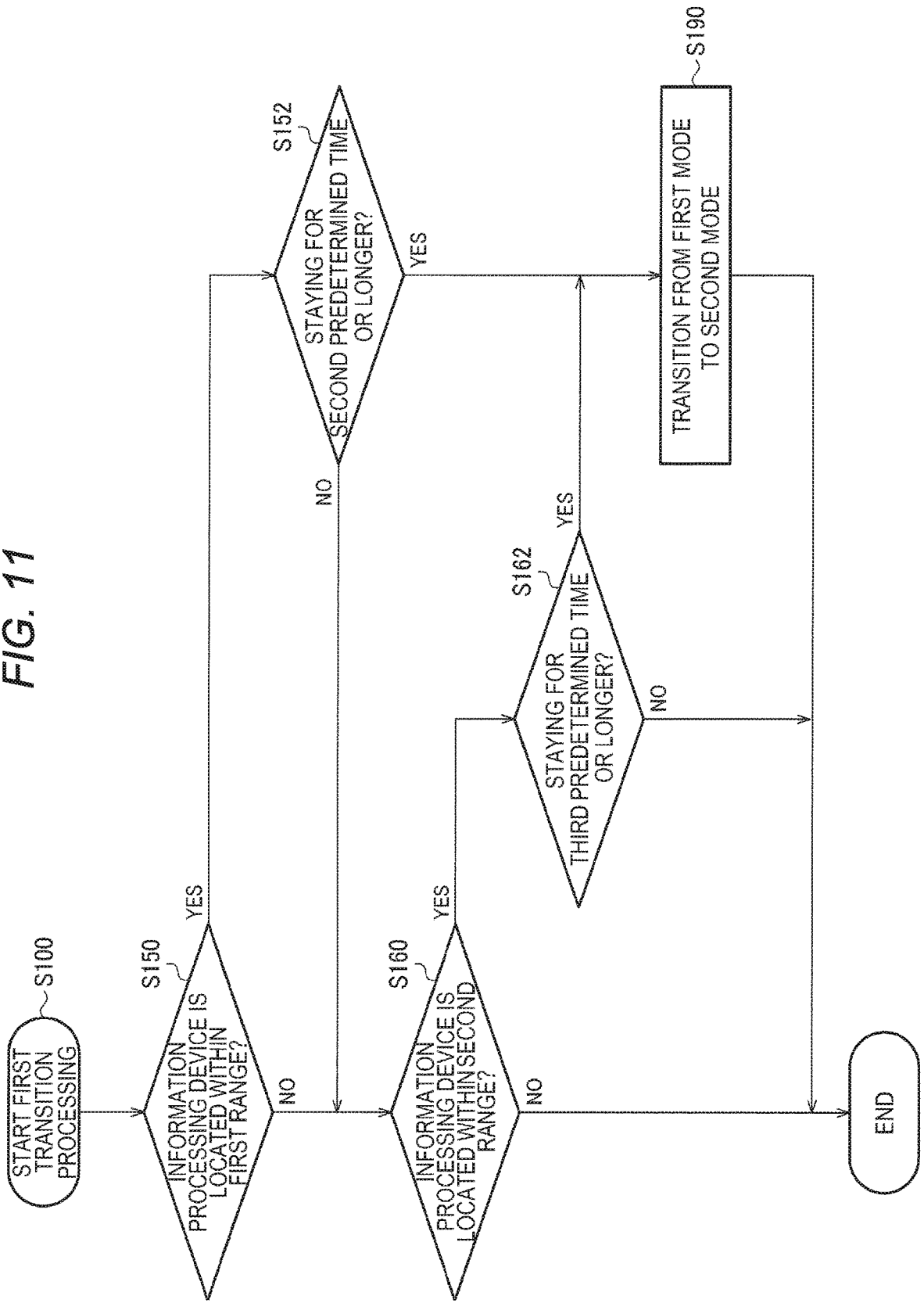
FIG. 11 is a flowchart explaining another processing example of the first transition processing.

Also, for example, the first transition processing (step S100) may be executed as in a processing example shown in the flowchart of FIG. 11. The processing unit 130 executes processing of determining whether the information processing device 200 is located within the first range or not (step S150). When the processing unit 130 has determined that the information processing device 200 is located within the first range (YES in step S150), the processing unit 130 executes processing of determining whether the information processing device 200 has been staying within the first range for the second predetermined time or longer, or not (step S152). For example, the processing unit 130 executes processing of causing a fifth timer counter to count at a first timing when it is determined that the angle based on the direction information acquired by the direction information acquisition unit 120 is the direction range of the second angle α2. The processing unit 130 then executes processing of resetting the count value of the fifth timer counter at a second timing when the angle based on the direction information acquired by the direction information acquisition unit 120 enters the direction range of the first angle α1 from the direction range of the second angle α2, and then starting the counting again. After the second timing, the processing unit 130 executes processing of determining whether the count value of the fifth timer counter has reached a fifth predetermined count value or not. The processing unit 130 can thus implement step S150.

Meanwhile, when the processing unit 130 has determined that the information processing device 200 is not located within the first range (NO in step S150), the processing unit 130 executes processing of determining whether the information processing device 200 is located within the second range or not (step S160). When the processing unit 130 has determined that the information processing device 200 has been staying within the first range for the second predetermined time or longer (YES in step S152), the processing unit 130 executes processing of performing a transition from the first mode MD1 to the second mode MD2 (step S190) and ends the flow. Meanwhile, when the processing unit 130 has determined that the time for which the information processing device 200 has been staying within the first range is less than the second predetermined time (NO in step S152), the processing unit 130 executes the foregoing step S160. When the processing unit 130 has determined that the information processing device 200 is located within the second range (YES in step S160), the processing unit 130 executes processing of determining whether the information processing device 200 has been staying within the second range for the third predetermined time or longer, or not (step S162). For example, the processing unit 130 executes processing of determining whether the count value of the fifth timer counter having started counting at the first timing has reached a sixth predetermined count value or not. The processing unit 130 can thus implement step S162. The processing unit 130 may temporarily store time information corresponding to the first timing. Thus, for example, even when the user moves to and from the first range and the second range, the processing unit 130 can accurately grasp the start timing of the third predetermined time.

Meanwhile, when the processing unit 130 has determined that the information processing device 200 is not located within the second range (NO in step S160), the processing unit 130 ends the flow. When the processing unit 130 has determined that the information processing device 200 has been staying within the second range for the third predetermined time or longer (YES in step S162), the processing unit 130 executes processing of performing a transition from the first mode MD1 to the second mode MD2 (step S190) and ends the flow. Meanwhile, when the processing unit 130 has determined that the time for which the information processing device 200 has been staying within the second range is less than the third predetermined time (NO in step S162), the processing unit 130 ends the flow.

As described above, in the electronic device 100 in this embodiment, the processing unit 130 causes the electronic device 100 to continue operating in the first mode MD1 when it is determined that the information processing device 200 is located in neither the first range nor the second range while the electronic device 100 is operating in the first mode MD1. Also, the processing unit 130 performs a transition from the first mode MD1 to the second mode MD2, when it is determined that the information processing device 200 is located within the first range and the stay time is equal to or longer than the second predetermined time while the electronic device 100 is operating in the first mode MD1. Also, the processing unit 130 performs a transition from the first mode MD1 to the second mode MD2, when it is determined that the information processing device 200 is not located within the first range and is located within the second range and the stay time is equal to or longer than the third predetermined time while the electronic device 100 is operating in the first mode MD1. With such a configuration, the processing unit 130 can control the state of the electronic device 100 at a proper timing while determining which of the first range and the second range the information processing device 200 is located in. Also, with such a configuration, the processing unit 130 can grasp the second predetermined time and the third predetermined time, using a single timer counter. While the control via the first timer counter and the second timer counter is needed in the case of the flow shown in FIG. 9 as described above, the control via the fifth timer counter suffices in the case of the flow shown in FIG. 11.

Figure 12:
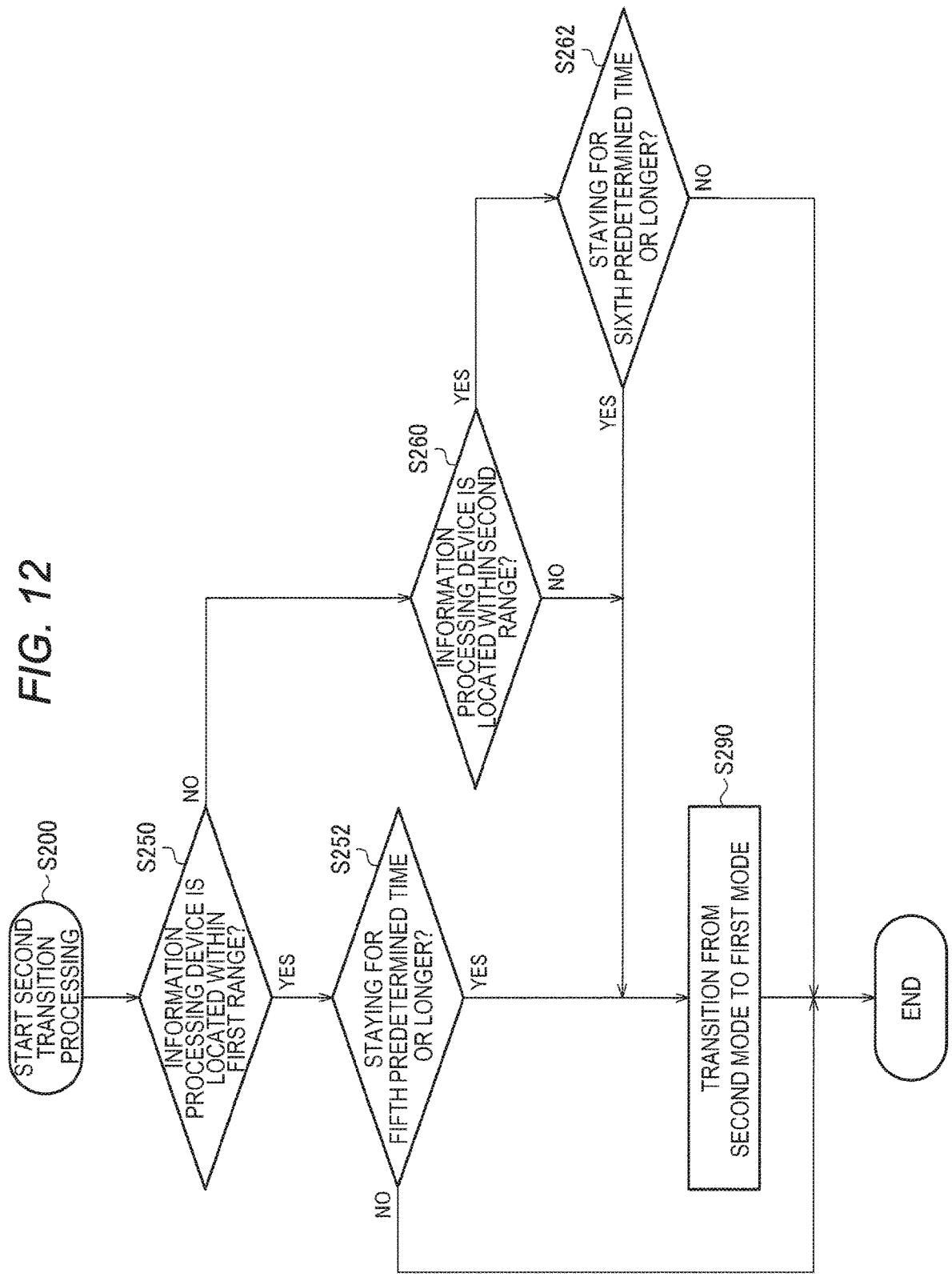
FIG. 12 is a flowchart explaining another processing example of the second transition processing.

Similarly, the second transition processing (step S200) may be executed as in a processing example shown in the flowchart of FIG. 12. The processing unit 130 executes processing of determining whether the information processing device 200 is located within the first range or not (step S250). When the processing unit 130 has determined that the information processing device 200 is located within the first range (YES in step S250), the processing unit 130 executes processing of determining whether the information processing device 200 has been staying within the first range for the fifth predetermined time or longer, or not (step S252). For example, the processing unit 130 executes processing of causing a sixth timer counter to count at a third timing when it is determined that the angle based on the direction information acquired by the direction information acquisition unit 120 is the direction range of the second angle α2. The processing unit 130 then executes processing of resetting the count value of the sixth timer counter at a fourth timing when the angle based on the direction information acquired by the direction information acquisition unit 120 enters the direction range of the first angle α1 from the direction range of the second angle α2, and then starting the counting again. After the fourth timing, the processing unit 130 executes processing of determining whether the count value of the sixth timer counter has reached a sixth predetermined count value or not. The processing unit 130 can thus implement step S250.

Meanwhile, when the processing unit 130 has determined that the information processing device 200 is not located within the first range (NO in step S250), the processing unit 130 executes processing of determining whether the information processing device 200 is located within the second range or not (step S260). When the processing unit 130 has determined that the information processing device 200 has been staying within the first range for the fifth predetermined time or longer (YES in step S252), the processing unit 130 executes processing of performing a transition from the second mode MD2 to the first mode MD1 (step S290) and ends the flow. Meanwhile, when the processing unit 130 has determined that the time for which the information processing device 200 has been staying within the first range is less than the fifth predetermined time (NO in step S252), the processing unit 130 ends the flow. When the processing unit 130 has determined that the information processing device 200 is located within the second range (YES in step S260), the processing unit 130 executes processing of determining whether the information processing device 200 has been staying within the second range for the sixth predetermined time or longer, or not (step S262). For example, the processing unit 130 executes processing of determining whether the count value of the sixth timer counter having started counting at the third timing has reached a sixth predetermined count value or not. The processing unit 130 can thus implement step S262. Also, when the angle based on the direction information acquired by the direction information acquisition unit 120 enters the direction range of the second angle α2 from the direction range of the first angle α1 at the fifth timing before YES in the foregoing step S252, the processing unit 130 executes processing of resetting the counter value of the sixth timer counter and starting the counting again. After the fifth timing, the processing unit 130 executes processing of determining whether the count value of the sixth timer counter has reached the sixth count value or not.

Meanwhile, when the processing unit 130 has determined that the information processing device 200 is not located within the second range (NO in step S260), the processing unit 130 executes processing of performing a transition from the second mode MD2 to the first mode MD1 (step S290) and ends the flow. When the processing unit 130 has determined that the information processing device 200 has been staying within the second range for the sixth predetermined time or longer (YES in step S262), the processing unit 130 executes processing of performing a transition from the second mode MD2 to the first mode MD1 (step S290) and ends the flow. Meanwhile, when the processing unit 130 has determined that the time for which the information processing device 200 has been staying within the second range is less than the sixth predetermined time (NO in step S262), the processing unit 130 ends the flow.

As described above, in the electronic device 100 in this embodiment, the processing unit 130 performs a transition to the first mode MD1 when it is determined that the information processing device 200 is located in neither the first range nor the second range while the electronic device 100 is operating in the second mode MD2. Also, the processing unit 130 performs a transition from the second mode MD2 to the first mode MD1, when it is determined that the information processing device 200 is located within the first range and the stay time is equal to or longer than the fifth predetermined time while the electronic device 100 is operating in the second mode MD2. Also, the processing unit 130 performs a transition from the second mode MD2 to the first mode MD1, when it is determined that the information processing device 200 is not located within the first range and is located within the second range and the stay time is equal to or longer than the sixth predetermined time while the electronic device 100 is operating in the second mode MD2. Such a configuration can achieve effects similar to those in the case of FIG. 11.

The foregoing examples are processing examples using the first range and the like based on the direction information. However, the technique in this embodiment is not limited to the above and may be performed as a processing example using a third range as well in consideration of information about distance. The third range is a range of a predetermined distance from the reference location, of the foregoing first range indicated by A1, for example, as indicated by D3 in FIG. 13. The processing unit 130 can acquire information about distance, for example, using a technique described below, and thus can execute processing using the third range. When the BLE communication unit of the wireless communication unit 110 receives a radio wave based on BLE, a BLE advertisement packet includes reference radio wave intensity information and therefore the processing unit 130 can acquire the information about the distance between the information processing device 200 and the electronic device 100. The reference radio wave intensity is the received signal strength indication (RSSI) of a beacon signal at a receiving-side device installed at a location away from a transmitting-side device of the beacon signal by a reference distance. The radio wave intensity is in inverse proportion to the square of the distance. Therefore, if the radio wave intensity at the reference distance is known, the processing unit 130 can compute the information about the distance between the information processing device 200 and the electronic device 100 or the like, based on the radio wave intensity of the BLE beacon signal actually received by the BLE communication unit. The information about the distance between the information processing device 200 and the electronic device 100 or the like may be, for example, a specific distance such as "1.5 m" but may also be, for example, information that can distinguish the first range and the third rage.

Figure 14:
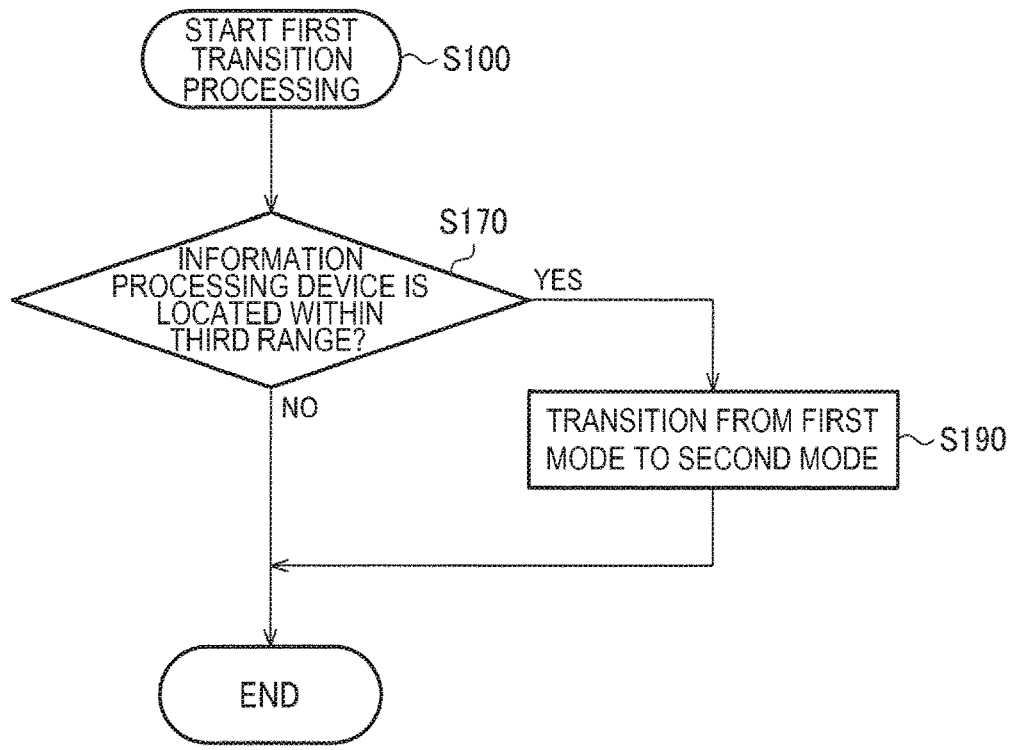
FIG. 14 is a flowchart explaining another processing example of the first transition processing.

As a processing example using the third range, specifically, for example, the first transition processing (step S100) may be executed as in a processing example shown in a flowchart of FIG. 14. The processing unit 130 executes processing of determining whether the information processing device 200 is located within the third range or not (step S170). When the processing unit 130 has determined that the information processing device 200 is located within the third range (YES in step S170), the processing unit 130 executes processing of performing a transition from the first mode MD1 to the second mode MD2 (step S190) and ends the flow. Meanwhile, when the processing unit 130 has determined that the information processing device 200 is not located within the third range (NO in step S170), the processing unit 130 ends the flow. In the case of executing the processing shown in FIG. 14, when the information processing device 200 is located within the first range indicated by A1 in FIG. 13, the first transition processing (step S100) is not executed. In this way, in the electronic device 100 in this embodiment, the processing unit 130 performs a transition from the first mode MD1 to the second mode MD2 when the information processing device 200 is located in the third range, which is a direction range of a predetermined angle from the reference location and of a predetermined distance from the reference location, while the electronic device 100 is operating in the first mode MD1. Thus, the range where the information processing device 200 should be located in order for the processing unit 130 to perform a transition from the first mode MD1 to the second mode MD2 can be made more appropriate.

Figure 15:
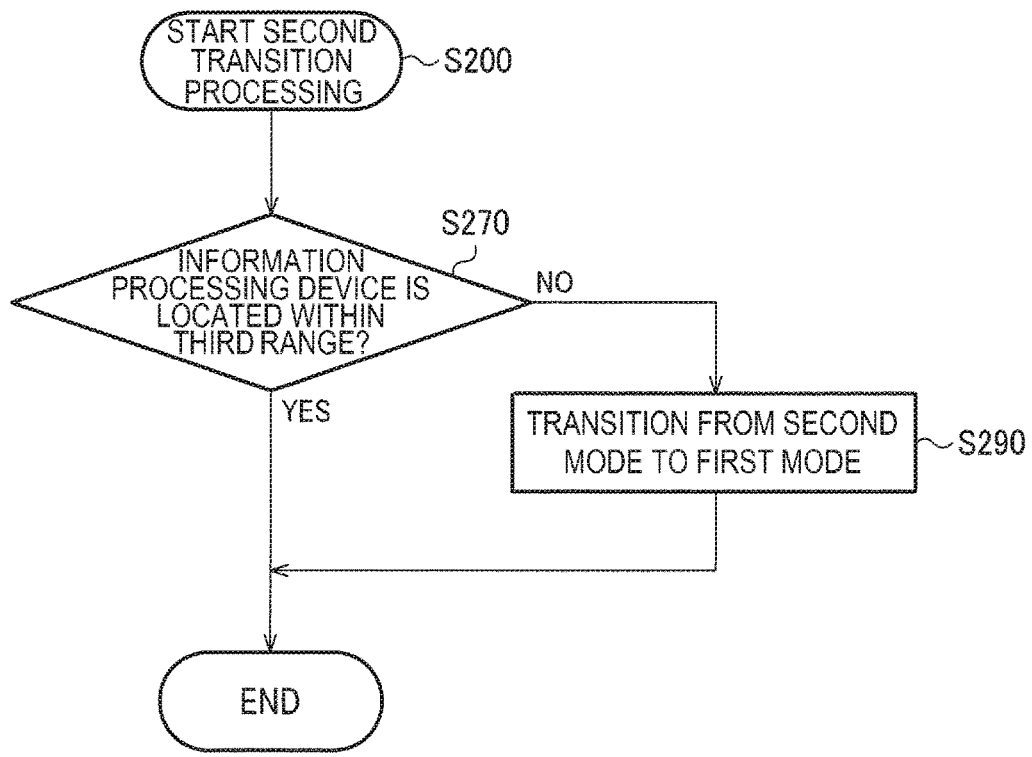
FIG. 15 is a flowchart explaining another processing example of the second transition processing.

Similarly, as a processing example using the third range, for example, the second transition processing (step S200) may be executed as in a processing example shown in a flowchart of FIG. 15. The processing unit 130 executes processing of determining whether the information processing device 200 is located within the third range or not (step S270). When the processing unit 130 has determined that the information processing device 200 is not located within the third range (NO in step S270), the processing unit 130 executes processing of performing a transition from the second mode MD2 to the first mode MD1 (step S290) and ends the flow. Meanwhile, when the processing unit 130 has determined that the information processing device 200 is located within the third range (YES in step S270), the processing unit 130 ends the flow. In this way, in the electronic device 100 in this embodiment, the processing unit 130 performs a transition from the second mode MD2 to the first mode MD1 when the information processing device 200 is not located in the third range, which is a direction range of a predetermined angle from the reference location and of a predetermined distance from the reference location, while the electronic device 100 is operating in the second mode MD2. Thus, the range where the information processing device 200 should be located in order for the processing unit 130 to perform a transition from the second mode MD2 to the first mode MD1 can be made more appropriate.

In the case of the processing using the third range as shown in FIGS. 14 and 15, again, loop processing where either the first transition processing (step S100) or the second transition processing (step S200) is executed without fail, or loop processing where only one of the first transition processing (step S100) and the second transition processing (step S200) is executed, may be employed. As described above, in the electronic device 100 in this embodiment, the processing unit 130 performs at least one of a transition from the first mode MD1 to the second mode MD2 and a transition from the second mode MD2 to the first mode MD1, based on the Bluetooth signal intensity and the direction information. Thus, the processing unit 130 can control the mode of the electronic device 100 more properly, using Bluetooth.

FIGS. 14 and 15 explain a processing example using the third range, which is in the first range and of a predetermined distance. However, the technique in this embodiment may also be performed as a processing example using a fourth range. The fourth range is specifically a range within the foregoing second range indicated by B2, B3 and of a predetermined distance from the operation unit 140 as a reference location, as indicated by E4, F4 in FIG. 13. For example, in the flow shown in FIG. 9, the first range in step S130 may be replaced with the third range and the second range in step S140 may be replaced with the fourth range. That is, the processing unit 130 performs a transition from the first mode MD1 to the second mode MD2 when the stay time for which the information processing device 200 is located within the third range is equal to or longer than a seventh predetermined time while the electronic device 100 is operating in the first mode MD1. Also, the processing unit 130 performs a transition from the first mode MD1 to the second mode MD2 when the stay time for which the information processing device 200 is located within the fourth range, which is a direction range of a broader angle from the reference location than the third range, is equal to or longer than an eighth predetermined time, which is longer the seventh predetermined time, while the electronic device 100 is operating in the first mode MD1. Thus, the range where the information processing device 200 should be located in order to perform mode control can be made more appropriate. The relationship between the seventh predetermined time and the eighth predetermined time is similar to the relationship between the second predetermined time and the third predetermined time described above with reference to FIG. 9 and can be suitably set by the user.

Similarly, for example, in the flow shown in FIG. 10, the first range in step S230 may be replaced with the third range and the second range in step S240 may be replaced with the fourth range. That is, the processing unit 130 performs a transition from the second mode MD2 to the first mode MD1 when the stay time for which the information processing device 200 is located within the third range is equal to or longer than a ninth predetermined time while the electronic device 100 is operating in the second mode MD2. Also, the processing unit 130 performs a transition from the second mode MD2 to the first mode MD1 when the stay time for which the information processing device 200 is located within the fourth range, which is a direction range of a broader angle from the reference location than the third range, is equal to or longer than a tenth predetermined time, which is shorter the ninth predetermined time, while the electronic device 100 is operating in the second mode MD2. Thus, the range where the information processing device 200 should be located in order to perform mode control can be made more appropriate. The relationship between the ninth predetermined time and the tenth predetermined time is similar to the relationship between the fifth predetermined time and the sixth predetermined time described above with reference to FIG. 10 and can be suitably set by the user.

The above technique can be similarly applied to the flows shown in FIGS. 11 and 12. That is, the processing unit 130 causes the electronic device 100 to continue operating in the first mode MD1 when it is determined that the information processing device 200 is located in neither the third range nor the fourth range while the electronic device 100 is operating in the first mode MD1. Also, the processing unit 130 performs a transition from the first mode MD1 to the second mode MD2, when it is determined that the information processing device 200 is located within the third range and the stay time is equal to or longer than the seventh predetermined time while the electronic device 100 is operating in the first mode MD1. Also, the processing unit 130 performs a transition from the first mode MD1 to the second mode MD2, when it is determined that the information processing device 200 is not located within the third range and is located within the fourth range and the stay time is equal to or longer than the eighth predetermined time while the electronic device 100 is operating in the first mode MD1. Meanwhile, the processing unit 130 performs a transition to the first mode MD1 when it is determined that the information processing device 200 is located in neither the third range nor the fourth range while the electronic device 100 is operating in the second mode MD2. Also, the processing unit 130 performs a transition from the second mode MD2 to the first mode MD1, when it is determined that the information processing device 200 is located within the third range and the stay time is equal to or longer than the ninth predetermined time while the electronic device 100 is operating in the second mode MD2. Also, the processing unit 130 performs a transition from the second mode MD2 to the first mode MD1, when it is determined that the information processing device 200 is not located within the third range and is located within the fourth range and the stay time is equal to or longer than the tenth predetermined time while the electronic device 100 is operating in the second mode MD2. Thus, the range where the information processing device 200 should be located in order to perform mode control can be made more appropriate.

Figure 16:
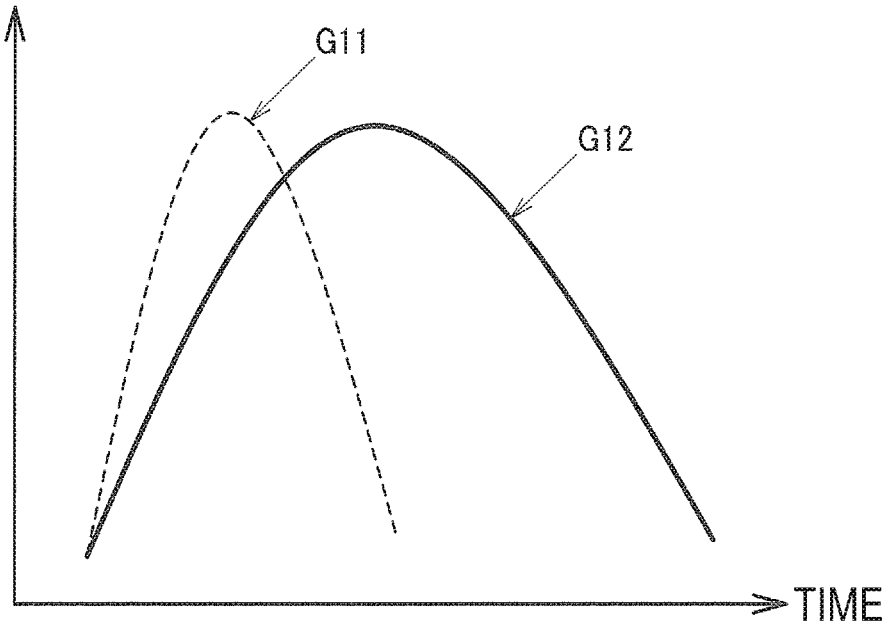
FIG. 16 explains an example of signal intensity.

The technique in this embodiment is not limited to the above and can be implemented with various modifications. For example, the processing unit 130 may also take the amount of change in the intensity of the beacon signal into consideration in addition to the direction information. For example, the behavior of the signal intensity of the beacon signal differs between a first user crossing in front of the electronic device 100 and a second user approaching the electronic device 100 in order to use the electronic device 100. Specifically, for example, the first user passes in front of the electronic device 100 without reducing the speed, whereas the second user approaches the electronic device 100 while reducing the speed, in order to carry out a predetermined task in front of the electronic device 100. Therefore, the signal intensity of the beacon signal received by the electronic device 100 from the information processing device 200 held by the first user changes as indicated by G11 in FIG. 16, whereas the signal intensity of the beacon signal received by the electronic device 100 from the information processing device 200 held by the second user changes as indicated by G12 in FIG. 16. In this way, when it can be determined that the behavior of the signal intensity of the beacon signal indicates that it is the first user, the processing unit 130 may add processing of not executing the first transition processing (step S100). This is because it is desirable that the electronic device 100 operating in the first mode MD1 with lower power consumption maintains the first mode MD1 since the first user does not use the electronic device 100.

Figure 17:
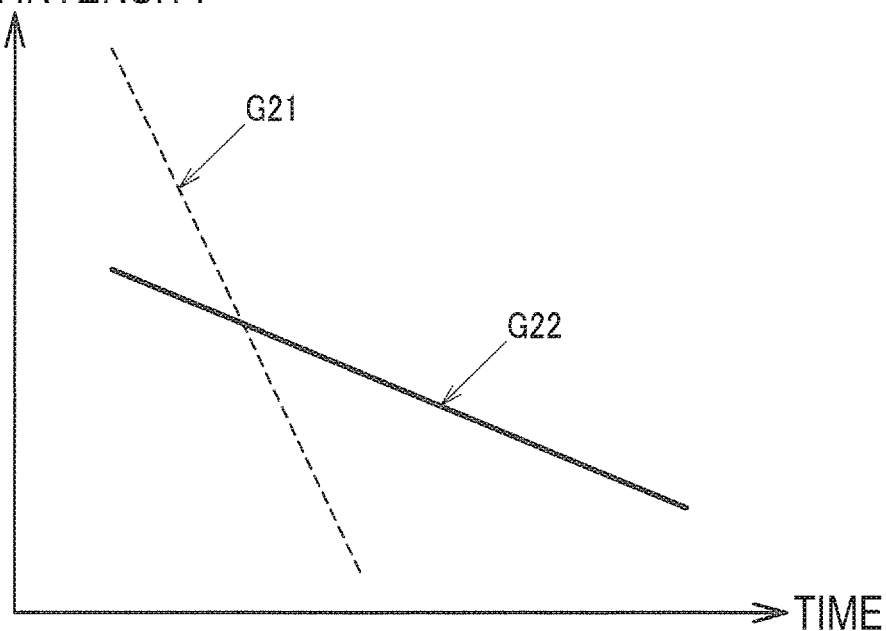
FIG. 17 explains an example of the amount of change in signal intensity.

The processing unit 130 may find the amount of change in the signal intensity and determine whether it is the first user or not, based on the amount of change. For example, when the lines indicated by G11 and G12 in the graph shown in FIG. 16 can be approximated as quadratic curves, differentiation by time turns these quadratic curves into straight lines indicated by G21 and G22 shown in FIG. 17. When the straight line G21 and the straight line G22 are compared with each other, it can be understood that the straight line G21 has a steeper gradient. Therefore, the processing unit 130 executes processing of finding the amount of change in the signal intensity as shown in FIG. 17, based on the received signal intensity. When the gradient of the straight line indicating the amount of change in the signal intensity is greater than a predetermined level, the processing unit 130 can determine that it is a beacon signal from the information processing device 200 of the first user. As described above, in the electronic device 100 in this embodiment, the processing unit 130 performs a transition from the first mode MD1 to the second mode MD2, based on the amount of change in the intensity of the beacon signal received by the wireless communication unit 110. Thus, the processing unit 130 can control the mode of the electronic device 100, based on the determination about whether it is a user who uses the electronic device 100 or not.

The technique in this embodiment is not limited to this and can be implemented with various modifications. For example, as another modification example, the state of the electronic device 100 may include a third mode, not illustrated, other than the first mode MD1 and the second mode MD2. The third mode is a mode where, as in the second mode MD2, the supply of power to each function forming the electronic device 100 is not limited, but where the processing of transition to the first mode MD1 is limited. For example, the processing unit 130 controls the on- or off-state of a second flag, not illustrated, and thus can determine whether the electronic device 100 is in the second mode MD2 or the third mode, or not. For example, though the illustration of a flowchart is omitted, when the state of the electronic device 100 is the third mode, the processing unit 130 may execute processing of not applying the second transition processing (step S200). Thus, for example, when a mode where a normal error has occurred is defined as the second mode MD2 and a mode where a serious error has occurred is defined as the third mode, the problem of the user failing to notice a serious error by performing a transition to the first mode MD1 can be prevented.

As described above, the electronic device according to this embodiment that wirelessly communicates with an information processing device via a wireless communication unit and can operate at least in a first mode and in a second mode that is a state where power consumption is higher than in the first mode. The electronic device includes a direction information acquisition unit and a processing unit. The direction information acquisition unit acquires direction information about a direction of the information processing device in relation to a reference location of the electronic device by the wireless communication with the information processing device via the wireless communication unit. The processing unit performs at least one of a transition from the first mode to the second mode and a transition from the second mode to the first mode, based on the direction information.

Thus, the mode transition of the electronic device can be controlled, based on the direction information. Therefore, the mode transition of the electronic device can be performed at a more proper timing.

The processing unit may perform a transition from the first mode to the second mode when it is determined that the information processing device is located within a first range, which is a direction range of a predetermined angle from the reference location, while the electronic device is operating in the first mode.

Thus, the processing unit can perform a transition to the second mode, where the user can use the electronic device, after grasping that the user is close enough to be within the direction range of the predetermined angle to the electronic device.

The reference location may be a location of an operation unit. The first range may be a direction range including a front direction from the operation unit.

Thus, the processing unit can control the state of the electronic device, based on the direction information taking the front side of the operation unit as a reference point.

The wireless communication unit may be provided at a place where the operation unit is installed.

Thus, the user can grasp the reference location from outside the electronic device.

The processing unit may perform a transition from the first mode to the second mode when a stay time of the information processing device in the first range is equal to or longer than a first predetermined time while the electronic device is operating in the first mode. The first predetermined time may vary depending on a location where the information processing device is located.

Thus, the processing unit can perform a transition from the first mode to the second mode at a more proper timing.

The processing unit may perform a transition from the first mode to the second mode when the stay time for which the information processing device is located in the first range is equal to or longer than a second predetermined time while the electronic device is operating in the first mode. Also, the processing unit may perform a transition from the first mode to the second mode when the stay time for which the information processing device is located in a second range, which is a direction range of a broader angle from the reference location than the first range, is equal to or longer than a third predetermined time, which is longer than the second predetermined time, while the electronic device is operating in the first mode.

Thus, the processing unit can perform a transition from the first mode to the second mode at a more proper timing according to the location where the information processing device is located.

The processing unit may cause the electronic device to continue operating in the first mode when it is determined that the information processing device is located in neither the first range nor the second range while the electronic device is operating in the first mode. Also, the processing unit may perform a transition from the first mode to the second mode, when it is determined that the information processing device is located within the first range and the stay time is equal to or longer than the second predetermined time while the electronic device is operating in the first mode. Also, the processing unit may perform a transition from the first mode to the second mode, when it is determined that the information processing device is not located within the first range and is located within the second range and the stay time is equal to or longer than the third predetermined time while the electronic device is operating in the first mode.

Thus, the processing unit can control the state of the electronic device at a proper timing while determining which of the first range and the second range the information processing device is located in.

The processing unit may perform a transition from the second mode to the first mode when it is determined that the information processing device is not located within a first range, which is a direction range of a predetermined angle from the reference location, while the electronic device is operating in the second mode.

Thus, the processing unit can perform a transition to the first mode with lower power consumption, after grasping that the user is not located in the direction range of the predetermined angle to the electronic device.

The processing unit may perform a transition from the second mode to the first mode after a stay time of the information processing device in the first range becomes equal to or longer than a fourth predetermined time while the electronic device is operating in the second mode. The fourth predetermined time may vary depending on a location where the information processing device is located.

Thus, the processing unit can perform a transition from the second mode to the first mode at a more proper timing.

The processing unit may perform a transition from the second mode to the first mode when the stay time of the information processing device in the first range is equal to or longer than a fifth predetermined time while the electronic device is operating in the second mode. Also, the processing unit may perform a transition from the second mode to the first mode when the stay time of the information processing device in a second range, which is a direction range of a broader angle from the reference location than the first range, is equal to or longer than a sixth predetermined time, which is shorter than the fifth predetermined time, while the electronic device is operating in the second mode.

Thus, the processing unit can perform a transition from the second mode to the first mode at a more proper timing according to the location where the information processing device is located.

The processing unit may perform a transition from the first mode to the second mode when the information processing device is located in a third range, which is a direction range of a predetermined angle from the reference location and of a predetermined distance from the reference location, while the electronic device is operating in the first mode.

Thus, the range where the information processing device should be located in order for the processing unit to perform a transition from the first mode to the second mode can be made more appropriate.

The processing unit may perform a transition from the second mode to the first mode when the information processing device is not located in a third range, which is a direction range of a predetermined angle from the reference location and of a predetermined distance from the reference location, while the electronic device is operating in the second mode.

Thus, the range where the information processing device should be located in order for the processing unit to perform a transition from the second mode to the first mode can be made more appropriate.

The processing unit may perform a transition from the first mode to the second mode, based on an amount of change in intensity of a beacon signal received by the wireless communication unit.

Thus, the processing unit can control the mode of the electronic device, based on the determination about whether it is a user who uses the electronic device or not.

A standard of the wireless communication may be a Bluetooth standard. The processing unit may perform at least one of a transition from the first mode to the second mode and a transition from the second mode to the first mode, based on a beacon signal conforming to the Bluetooth standard detected by the wireless communication unit.

Thus, a system for controlling the mode of the electronic device can be constructed, using Bluetooth.

The processing unit may perform at least one of a transition from the first mode to the second mode and a transition from the second mode to the first mode, based on an intensity of the Bluetooth signal and the direction information.

Thus, the processing unit can control the mode of the electronic device more properly, using Bluetooth.

The processing method according to the embodiment includes: processing of wirelessly communicating with an information processing device; processing of causing an electronic device to operate at least in a first mode and in a second mode that is a state where power consumption is higher than in the first mode; and processing of acquiring direction information about a direction of the information processing device in relation to a reference location of the electronic device by the wireless communication with the information processing device. The processing method according to the embodiment also includes at least one of processing of performing a transition from the first mode to the second mode and processing of performing a transition from the second mode to the first mode, based on the direction information.

The program according to the embodiment is used for an electronic device that wirelessly communicates with an information processing device via a wireless communication unit and that can operate at least in a first mode and in a second mode that is a state where power consumption is higher than in the first mode. The program causes a computer to function as a direction information acquisition unit and a processing unit. The direction information acquisition unit acquires direction information about a direction of the information processing device in relation to a reference location of the electronic device by the wireless communication with the information processing device via the wireless communication unit. The processing unit performs at least one of a transition from the first mode to the second mode and a transition from the second mode to the first mode, based on the direction information acquired by the direction information acquisition unit.

The embodiment has been described above in detail. However, a person skilled in the art can readily understand that various modifications can be made without substantially departing from the new matters and effects of the embodiment. Therefore, all such modification examples are included in the scope of the present disclosure. For example, a term described along with a different term having a broader meaning or the same meaning at least once in the specification or the drawings can be replaced with the different term at any point in the specification or the drawings. Also, all combinations of the embodiment and modification examples are included in the scope of the present disclosure. The configurations and operations of the electronic device, the processing method, and the program or the like are not limited to those described in the embodiment and can be implemented with various modifications.

What is claimed is:

1. An electronic device that wirelessly communicates with an information processing device via a wireless communication unit and that can operate at least in a first mode and in a second mode that is a state where power consumption is higher than in the first mode, the electronic device comprising:
a direction information acquisition unit acquiring direction information about a direction of the information processing device in relation to a reference location of the electronic device by the wireless communication with the information processing device via the wireless communication unit; and
a processor performing at least one of a transition from the first mode to the second mode and a transition from the second mode to the first mode, based on the direction information, wherein
the processor
performs a transition from the first mode to the second mode when a stay time for which the information processing device is located in a first range is equal to or longer than a first predetermined time while the electronic device is operating in the first mode, and
performs a transition from the first mode to the second mode when the stay time for which the information processing device is located in a second range, which is a direction range of a broader angle from the reference location than the first range, is equal to or longer than a second predetermined time, which is longer than the first predetermined time, while the electronic device is operating in the first mode.

2. The electronic device according to claim 1, wherein
the reference location is a location of an operation unit, and
the first range is a direction range including a front direction from the operation unit.

3. The electronic device according to claim 2, wherein
the wireless communication unit is provided at a place where the operation unit is installed.

4. The electronic device according to claim 1, wherein
the processor
causes the electronic device to continue operating in the first mode when it is determined that the information processing device is located in neither the first range nor the second range while the electronic device is operating in the first mode,
performs a transition from the first mode to the second mode, when it is determined that the information processing device is located within the first range and the stay time is equal to or longer than the first predetermined time while the electronic device is operating in the first mode, and
performs a transition from the first mode to the second mode, when it is determined that the information processing device is not located within the first range and is located within the second range and the stay time is equal to or longer than the second predetermined time while the electronic device is operating in the first mode.

5. The electronic device according to claim 1, wherein
the processor performs a transition from the second mode to the first mode when it is determined that the information processing device is not located within a first range, which is a direction range of a predetermined angle from the reference location, while the electronic device is operating in the second mode.

6. The electronic device according to claim 5, wherein
the processor performs a transition from the second mode to the first mode after a stay time of the information processing device in the first range becomes equal to or longer than a fourth third predetermined time while the electronic device is operating in the second mode, and
the third predetermined time varies depending on a location where the information processing device is located.

7. The electronic device according to claim 6, wherein
the processor
performs a transition from the second mode to the first mode when the stay time of the information processing device in the first range is equal to or longer than a fourth predetermined time while the electronic device is operating in the second mode, and
performs a transition from the second mode to the first mode when the stay time of the information processing device in a second range, which is a direction range of a broader angle from the reference location than the first range, is equal to or longer than a sixth fifth predetermined time, which is shorter than the fourth predetermined time, while the electronic device is operating in the second mode.

8. The electronic device according to claim 1, wherein the processor performs a transition from the first mode to the second mode when the information processing device is located in a third range, which is a direction range of a predetermined angle from the reference location and of a predetermined distance from the reference location, while the electronic device is operating in the first mode.

9. The electronic device according to claim 1, wherein the processor performs a transition from the second mode to the first mode when the information processing device is not located in a third range, which is a direction range of a predetermined angle from the reference location and of a predetermined distance from the reference location, while the electronic device is operating in the second mode.

10. The electronic device according to claim 1, wherein the processor performs a transition from the first mode to the second mode, based on an amount of change in intensity of a beacon signal received by the wireless communication unit.

11. The electronic device according to claim 1, wherein a standard of the wireless communication is a Bluetooth standard, and
the processor performs at least one of a transition from the first mode to the second mode and a transition from the second mode to the first mode, based on a beacon signal conforming to the Bluetooth standard detected by the wireless communication unit.

12. The electronic device according to claim 11, wherein the processor performs at least one of a transition from the first mode to the second mode and a transition from the second mode to the first mode, based on an intensity of the beacon signal conforming to the Bluetooth standard and the direction information.

13. A processing method comprising:
processing of wirelessly communicating with an information processing device;
processing of causing an electronic device to operate at least in a first mode and in a second mode that is a state where power consumption is higher than in the first mode;
processing of acquiring direction information about a direction of the information processing device in relation to a reference location of the electronic device by the wireless communication with the information processing device; and
at least one of processing of performing a transition from the first mode to the second mode and processing of performing a transition from the second mode to the first mode, based on the direction information, wherein
the transition from the first mode to the second mode is performed when the stay time for which the information processing device is located in a first range is equal to or longer than a first predetermined time while the electronic device is operating in the first mode, and
the transition from the first mode to the second mode is performed when the stay time for which the information processing device is located in a second range, which is a direction range of a broader angle from the reference location than the first range, is equal to or longer than a second predetermined time, which is longer than the first predetermined time, while the electronic device is operating in the first mode.

14. An electronic device that wirelessly communicates with an information processing device via a wireless communication unit and that can operate at least in a first mode and in a second mode that is a state where power consumption is higher than in the first mode, the electronic device comprising:
a direction information acquisition unit acquiring direction information about a direction of the information processing device in relation to a reference location of the electronic device by the wireless communication with the information processing device via the wireless communication unit; and
a processor performing at least one of a transition from the first mode to the second mode and a transition from the second mode to the first mode, based on the direction information,
wherein a processor performs a transition from the second mode to the first mode after a stay time of the information processing device in a first range, which is a direction range of a predetermined angle from the reference location, becomes equal to or longer than a predetermined time while the electronic device is operating in the second mode.

* * * * *